United States Patent
Oyake et al.

(10) Patent No.: US 10,445,336 B2
(45) Date of Patent: Oct. 15, 2019

(54) APPARATUS AND METHOD TO PROCESS PIECES OF COLLECTED DATA BASED ON DATA ARRIVAL STATES

(71) Applicant: FUJITSU LIMITED, Kawasaki-shi, Kanagawa (JP)

(72) Inventors: Tsuyoshi Oyake, Akashi (JP); Masao Tomofuji, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 242 days.

(21) Appl. No.: 15/218,419

(22) Filed: Jul. 25, 2016

(65) Prior Publication Data
US 2017/0039256 A1 Feb. 9, 2017

(30) Foreign Application Priority Data
Aug. 3, 2015 (JP) .................. 2015-153178

(51) Int. Cl.
G06F 7/00 (2006.01)
G06F 17/30 (2006.01)
G06F 16/25 (2019.01)

(52) U.S. Cl.
CPC .......... G06F 16/254 (2019.01); G06F 16/258 (2019.01)

(58) Field of Classification Search
CPC ......... G06F 17/30563; G06F 17/30569; G06F 16/258; G06F 16/254; G06Q 30/0209
USPC ........ 707/600, 601, 602, 740, 736, 737, 758
See application file for complete search history.

(56) References Cited

U.S. PATENT DOCUMENTS

2008/0126158 A1\* 5/2008 Notea ................. G06F 11/3447
705/7.22
2013/0212111 A1\* 8/2013 Chashchin ........ G06F 17/30707
707/740

FOREIGN PATENT DOCUMENTS

JP 2007-265029 10/2007
JP 2010-122880 6/2010

OTHER PUBLICATIONS

Toshiro Yuba et al., "Data-driven parallel computer", First edition, first printing, Ohmsha, Ltd., Jun. 20, 1993, pp. 15-16, 21-22, 29, and 76. (8 pages).
Japanese Office Action dated Mar. 12, 2019 in related Japanese Application No. 2015-153178 with English translation (23 pages).

\* cited by examiner

*Primary Examiner* — Md I Uddin
(74) *Attorney, Agent, or Firm* — Staas & Halsey LLP

(57) ABSTRACT

An apparatus collects record data from a plurality of information sources. When a process to be performed on the collected record data is determined, with reference to definition information on the process, to be able to generate result data from a single piece of the record data, the apparatus starts the process on the collected record data without waiting for an arrival of all the record data as a collection target from the plurality of information sources. When pieces of the record data are required to be referenced in order for the process to generate the result data and the pieces of the record data includes an uncollected piece of the record data, the apparatus starts the process in response to completion of collecting all the record data as the collection target from the plurality of information sources.

10 Claims, 23 Drawing Sheets

FIG. 14

| PRODUCT CODE | PRODUCT NAME | ORDER QUANTITY | PRICE | SUM | STORE | AGGREGATE |
|---|---|---|---|---|---|---|
| A0001 | MILK | 20 | 200 | 4000 | TOKYO | 4000 |
| A0002 | COFFEE | 4 | 120 | 480 | OSAKA | 3120 |
| B1001 | BREAD | 8 | 80 | 640 | | |
| B1002 | LUNCH BOX | 5 | 400 | 2000 | | | r1-2

FIG. 19 v3

| PRODUCT CODE | PRODUCT NAME | ORDER QUANTITY | PRICE | SUM | SHIPPING DATE | SHIPPING STORE |
|---|---|---|---|---|---|---|
| A0001 | MILK | 8 | 200 | 1600 | — | — |
| A0002 | COFFEE | 4 | 150 | 600 | — | — |
| A0004 | LUNCH BOX | 12 | 400 | 4800 | — | — |

FIG. 20 r2-2

| PRODUCT CODE | PRODUCT NAME | ORDER QUANTITY | PRICE | SUM | SHIPPING DATE | SHIPPING STORE | AGGREGATE |
|---|---|---|---|---|---|---|---|
| A0002 | COFFEE | 4 | 150 | 600 | 04/03 | TOKYO | 600 |
| A0001 | MILK | 8 | 200 | 1600 | 04/01 | OSAKA | 6400 |
| A0004 | LUNCH BOX | 12 | 400 | 4800 | 04/01 | | |

| ORDER | CONVERSION TYPE | FLAG | SOURCE INFORMATION |
|---|---|---|---|
| 1 | LINK | OFF | JOURNAL DATA J1, MASTER DATA M1 AND M2 |
| 2 | CALCULATE | OFF | JOURNAL DATA J1, MASTER DATA M2 |
| 3 | AGGREGATE | OFF | RESULTS OF TYPE CONVERSION (CALCULATION) |

L1

| SOURCE | STATUS |
|---|---|
| JOURNAL DATA J1 | UNARRIVED |
| MASTER DATA M1 | UNARRIVED |
| MASTER DATA M2 | UNARRIVED |

L2

… (1)

APPARATUS AND METHOD TO PROCESS PIECES OF COLLECTED DATA BASED ON DATA ARRIVAL STATES

CROSS-REFERENCE TO RELATED APPLICATION

This application is based upon and claims the benefit of priority of the prior Japanese Patent Application No. 2015-153178, filed on Aug. 3, 2015, the entire contents of which are incorporated herein by reference.

FIELD

The embodiments discussed herein are related to apparatus and method to process pieces of collected data based on data arrival states.

BACKGROUND

Extraction transformation and loading (ETL) is available as a technique to perform a series of operations on a collection of record data acquired from a link destination system.

ETL performs a series of operations to collect record data from the link destination system, including extracting the record data, performing a predetermined operation (transforming the record data), and storing and loading the record data onto a database or the link destination system.

An available ETL system, for example, collects and links record data (journal data) related to a daily amount of sales in business and record data (master data) related to customers and products. Such a system uses and applies the record data on a real-time basis, such as in sales policy that predicts a change in demand and in exchanging inventory among stores.

In a technique related to ETL, a processing function of a later state job object performs a predetermined process with output data generated by the processing function of an earlier state job object being handled as a variable, and waits on standby with no output data generated until the output data is generated.

Another available technique re-constructs process metadata in a batch process, stores information that is eligible for the batch process, performs a data processing process on information updated at each job system at an update timing thereof, and manages and discloses pre-aggregate results.

The related art described above is disclosed in Japanese Laid-open Patent Publication No. 2007-265029 and Japanese Laid-open Patent Publication No. 2010-122880.

SUMMARY

According to an aspect of the invention, an apparatus collects record data from a plurality of information sources. When a process to be performed on the collected record data is determined, with reference to definition information on the process, to be able to generate result data from a single piece of the record data, the apparatus starts the process on the collected record data without waiting for an arrival of all the record data as a collection target from the plurality of information sources. When pieces of the record data are required to be referenced in order for the process to generate the result data and the pieces of the record data includes an uncollected piece of the record data, the apparatus starts the process in response to completion of collecting all the record data as the collection target from the plurality of information sources.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a diagram illustrating an example of result data, according to an embodiment;

FIG. 19 is a diagram illustrating an example of virtual data, according to an embodiment;

FIG. 20 is a diagram illustrating an example of result data, according to an embodiment;

FIG. 22 is a diagram illustrating an example of a conversion list and an input source list, according to an embodiment;

DESCRIPTION OF EMBODIMENTS

The related art ETL waits on standby until all the record data as a process target is collected, and performs a predetermined process when all the record data is collected. The timing of the transmission of the record data from each link destination system is typically random. If the predetermined process begins when all the record data is collected, it takes time from the beginning of the collection of the record data to the beginning of the process.

It is preferable to advance the start timing of the process on the record data.

Embodiments are described below with reference to the drawings. Multiple embodiments may be used in combination as long as such a combination does not lead to any contradiction.

First Embodiment

Figure 1:
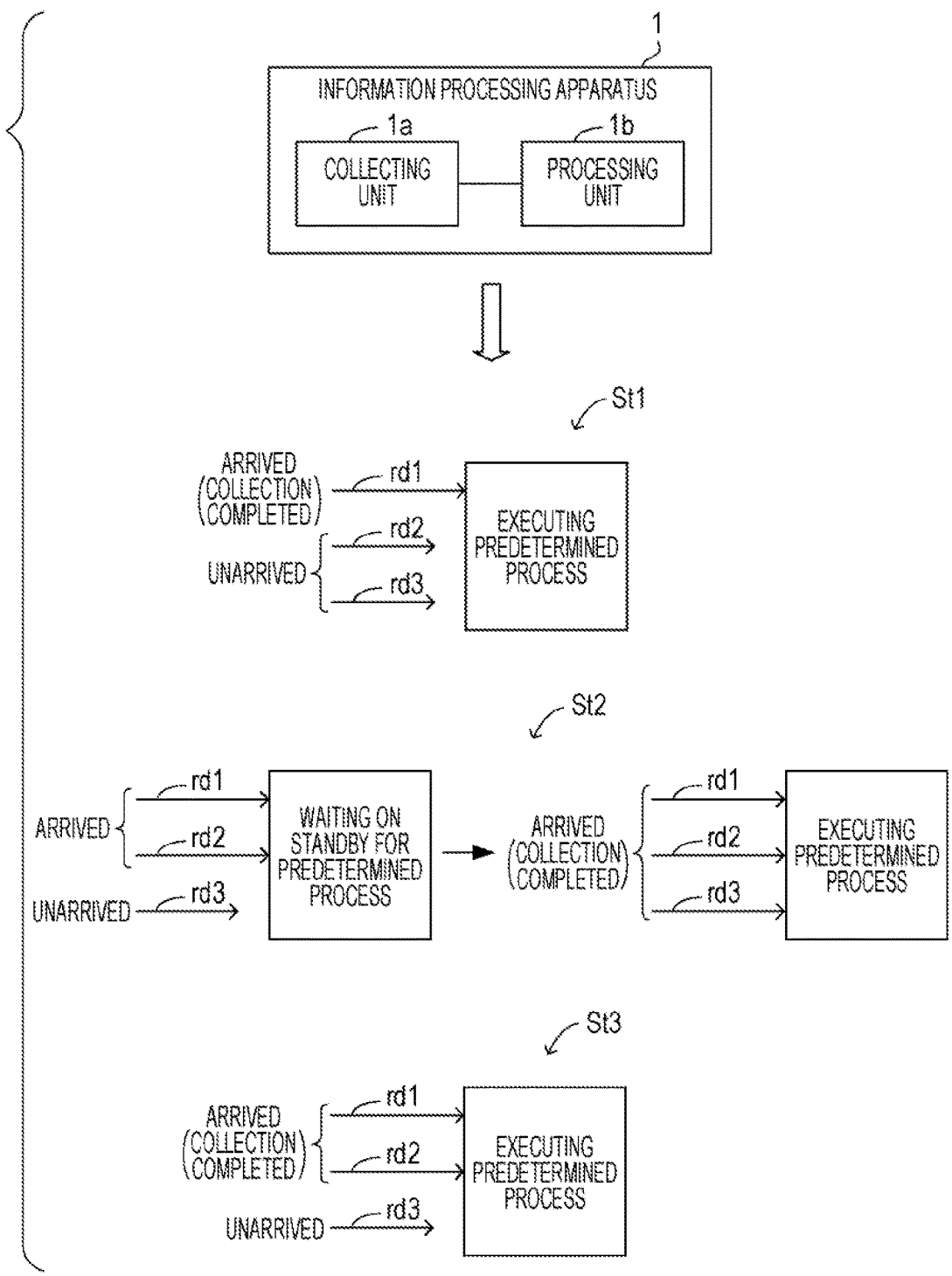
FIG. 1 is a diagram illustrating an example of functions of an information processing apparatus, according to an embodiment.

FIG. 1 illustrates an example of a function of an information processing apparatus 1 of a first embodiment. The information processing apparatus 1 includes a collecting unit 1a and a processing unit 1b.

The collecting unit 1a collects record data from multiple information sources. The processing unit 1b references definition information concerning a process when performing the process on the record data. When the process is able to generate result data from a single piece of the record data, the processing unit 1b starts the process without waiting for the arrival of all the record data as a collection target from the multiple information sources.

When multiple pieces of record data are required to be referenced for the process to generate the result data, and the multiple pieces of record data include an uncollected piece of record data, the processing unit 1b starts the process in response to the completion of the collection of all the record data as a collection target from the multiple information sources.

Referring to FIG. 1, the collecting unit 1a treats the record data rd1, rd2, and rd3 as the collection target, and the processing unit 1b performs a predetermined process on the record data rd1, rd2, and rd3 in accordance with definition information.

A status SU indicates that the predetermined process is able to generate the result data from a single piece of the record data. Once the record data rd1 is collected, the processing unit 1b performs the predetermined process without waiting for the arrival of the remaining record data rd2 and rd3.

A status St2 indicates that multiple pieces of the record data are required to be referenced for the predetermined process to generate the result data, and the multiple pieces of the record data include a piece of the record data that remains uncollected. In such a case, the processing unit 1b is to reference the record data rd1, rd2, and rd3. The processing unit 1b waits for the arrival of the record data rd3 and, and then performs the predetermined process once all the record data rd1, rd2, and rd3 have been collected.

A status St3 indicates that the record data that is required for the predetermined process to reference has been collected. When the record data rd1 and rd2 to be referenced have been collected, the processing unit 1b starts the predetermined process without waiting for the arrival of all the record data rd1, rd2, and rd3.

In this way, the information processing apparatus 1 references the definition information that defines the contents of the data processing. When data, on which part of the data processing is executable, is collected, the information processing apparatus 1 performs the process in advance without waiting for the collection of all the data, and thus advances the start timing of the data processing.

Second Embodiment

A second embodiment is described below. In accordance with the second embodiment, if a piece of the record data that is eligible for the process has been collected, the process of the record data is segmented into multiple operations such that the process is performed in advance without waiting for the collection of all the record data. In the discussion that follows, the record data is simply referred to as the data.

Figure 2:
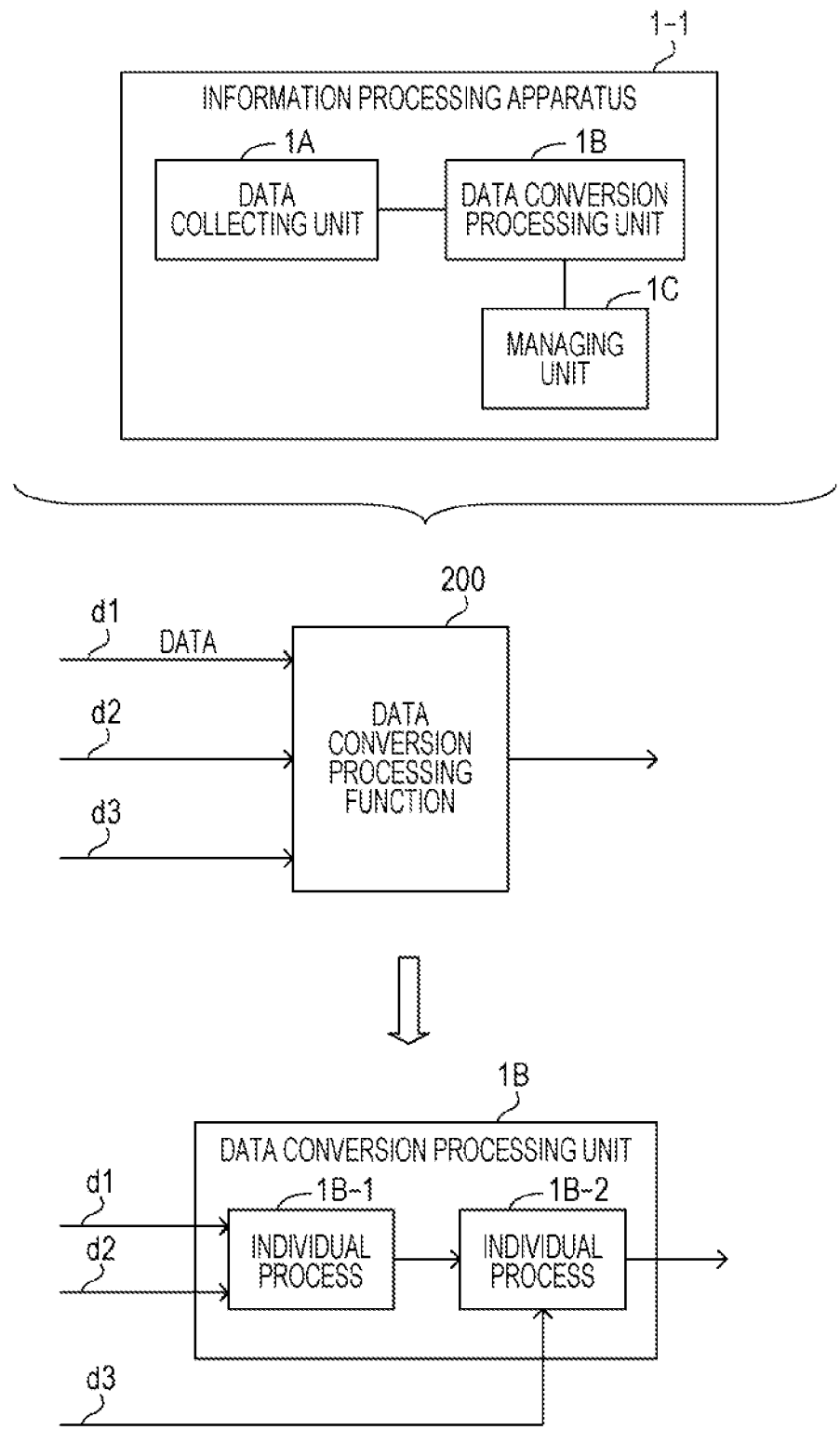
FIG. 2 is a diagram illustrating an example of functions of an information processing apparatus, according to an embodiment.

FIG. 2 illustrates an example of the function of an information processing apparatus 1-1 of a second embodiment. The information processing apparatus 1-1 includes a data collecting unit 1A, a data conversion processing unit 1B, and a managing unit 1C. The data collecting unit 1A has the function of the collecting unit 1a of FIG. 1, and the data conversion processing unit 1B has the function of the processing unit 1b of FIG. 1.

The data collecting unit 1A collects data from multiple information sources. When data, on which an individual process as part of a data conversion process is executable, has been collected, the data conversion processing unit 1B performs the individual process on the collected data without waiting for the collection of all the data by segmenting the data conversion process into the multiple individual processes. The managing unit 1C manages the definition information that defines an item entry that is used when the data conversion process is performed.

FIG. 2 is based on the premise that data d1 through d3 have been collected in the order of from data d1, d2, and d3 (with the data d1 collected first, and the data d3 collected last).

In such a case, a data conversion processing function 200 of related art performs the data conversion process after all the data d1, d2, and d3 have been collected. For this reason, the data conversion process is not performed until the last data d3 has been collected.

The data conversion process may be segmented into individual processes 1B-1 and 1B-2. The individual process 1B-1 is executable on the data d1 and d2, and the individual process 1B-2 is executable on the results of the individual process 1B-1 and the data d3.

The data conversion processing unit 1B in the information processing apparatus 1-1 segments the data conversion process into the individual process 1B-1 and the individual process 1B-2, and performs the individual process 1B-1 on the data d1 and d2 in advance, and then performs the subsequent individual process 1B-2 on the results of the individual process 1B-1 and the data d3.

Once data that is eligible for part of the data conversion process has been collected, the information processing apparatus 1-1 segments the data conversion process into multiple individual processes to perform the individual process in advance without waiting for the collection of all the data. In this way, the start timing of the data conversion process is advanced.

Based on the definition information managed by the managing unit 1C, the data conversion processing unit 1B determines the presence or absence of an item entry in the collected data, and performs the data conversion process by adaptively changing the execution order of the individual processes such that the individual process is performed in advance on the data including the item entry.

Third Embodiment

A third embodiment is described below. In accordance with the third embodiment, journal data and master data are collected from multiple link destination systems, and the data conversion process is performed on the collected data.

The data conversion process of related art is typically performed in overnight batch processing. The data conversion process is performed by several times during daytime today as the link destination systems increase in number with retail stores (such as convenience stores or supermarkets) becoming online linked.

Data collected from the link destination systems arrive at various timings. When data linking is performed after the data as a conversion target is fully collected, time is consumed before starting the process.

In accordance with the third embodiment, the number of multiple individual processes into which the data conversion process is segmented and the execution order of the individual processes are dynamically changed in response to the collection status of the data and the contents of the data. The data conversion process of ETL is thus sped up.

The start timing of the data conversion process is advanced, and output results are obtained earlier. Processing efficiency is thus increased.

Figure 3:
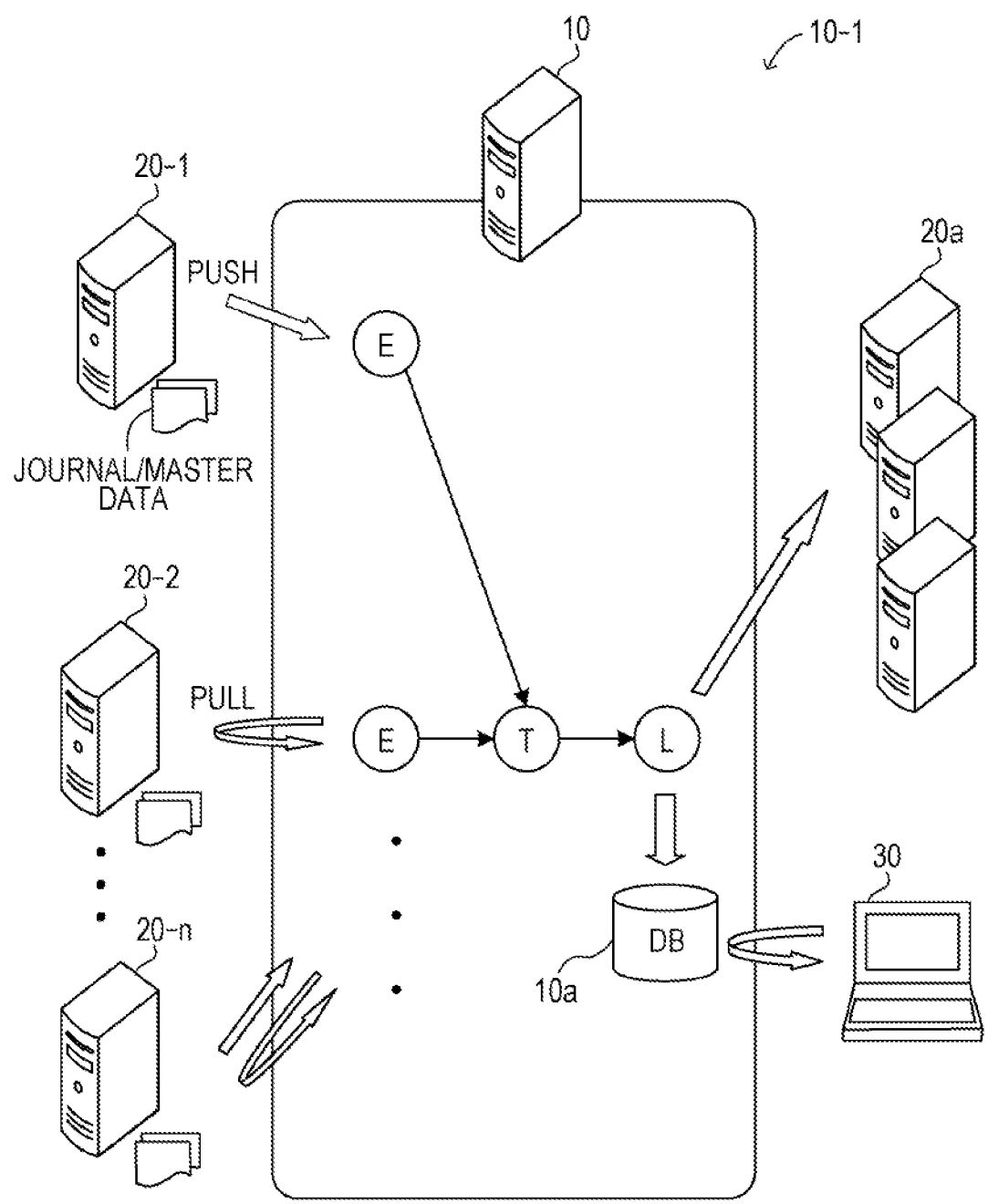
FIG. 3 is a diagram illustrating an example of a system configuration, according to an embodiment.

FIG. 3 illustrates a system configuration of the third embodiment. An ETL system 10-1 includes a server 10, link destination systems 20-1 through 20-n, a link destination system 20a and a client apparatus 30.

The server 10 includes a database 10a. The server 10 connects to the link destination systems 20-1 through 20-n, the link destination system 20a, and the client apparatus 30.

The server 10 extracts the journal data and master data from the link destination systems 20-1 through 20-n (pushes the journal data and the master data to or pulls the journal data and the master data from the link destination systems 20-1 through 20-n).

The server 10 performs the predetermined data conversion process on the journal data and master data (transforms the journal data and master data), stores process results on the database 10a, and performs a delivery process on the link destination system 20a (loads the process results to the link destination system 20a). The data stored on the database 10a is transmitted to the client apparatus 30, and used by a user.

Figure 4:
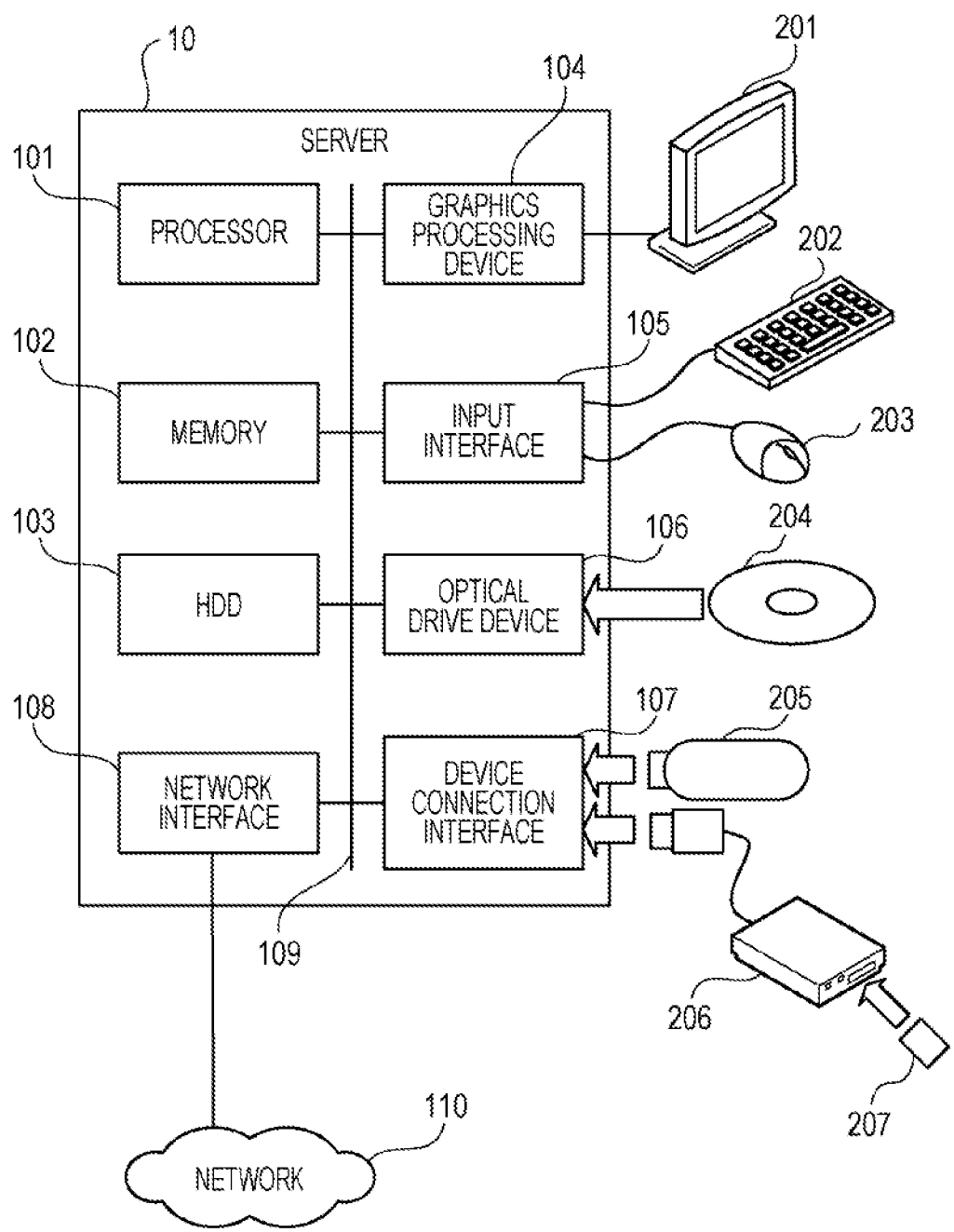
FIG. 4 is a diagram illustrating an example of a hardware configuration of a server, according to an embodiment.

FIG. 4 illustrates a hardware configuration of the server 10 of the third embodiment. The server 10 is entirely controlled by a processor 101. The processor 101 is connected to a memory 102, and multiple peripheral devices via a bus 109. The processor 101 may be a multi-processor. For example, the processor 101 may be a central processing unit (CPU), a micro-processing unit (MPU), or a digital signal processor (DSP). At least part of the function of the processor 101 may be implemented using an electronic circuit, such as an application specific integrated circuit (ASIC) or a programmable logic device (PLD).

The memory 102 serves as a main storage device of the server 10. The memory 102 temporarily stores at least part of an operating system (OS) and an application program, to be executed by the processor 101. The memory 102 also stores a variety of data to be used by the processor 101. The memory 102 may be a volatile semiconductor memory device, such as a random-access memory (RAM).

The peripheral devices connected to the bus 109 include a hard disk drive (HDD) 103, a graphic processing device 104, an input interface 105, an optical drive device 106, a device connection interface 107, and a network interface 108.

The HDD 103 magnetically writes data to or reads data from a built-in disk. The HDD 103 is used as an auxiliary storage device to the server 10. The HDD 103 stores an OS program, an application program, and a variety of data. A non-volatile semiconductor memory device, such as a flash memory, may also be used for the auxiliary storage device.

The graphic processing device 104 is connected to a monitor 201. The graphic processing device 104 causes the monitor 201 to display an image on the screen thereof in response to a command from the processor 101. The monitor 201 may be a display device of a cathode ray tube (CRT) or a liquid-crystal display device.

The input interface 105 is connected to a keyboard 202 and a mouse 203. The input interface 105 transfers a signal from the keyboard 202 or the mouse 203 to the processor 101. The mouse 203 is an example of a pointing device, and another pointing device may be used. The other pointing device may be a touch panel, a tablet, a touchpad, or a trackball.

The optical drive device 106 reads data recorded on an optical disk 204 using a laser light beam. The optical disk 204 is a portable recording medium having data recorded thereon in a manner that allows the data to be read using a reflected light beam. The optical disk 204 may be a digital versatile disk (DVD), a DVD-RAM, a compact disk read only memory (CD-ROM), a CD-R (recordable) or a CD-RW (rewritable).

The device connection interface 107 is a communication interface that connects a peripheral device to the server 10. For example, the device connection interface 107 may be connected to a memory device 205 or a memory reader-writer 206. The memory device 205 is a recording medium having a communication function for communicating with the device connection interface 107. The memory reader-writer 206 writes data onto a memory card 207 or reads data from the memory card 207. The memory card 207 is a card-type memory medium.

The network interface 108 is connected to the network 110. The network interface 108 transmits data to or receives data from another computer or a communication device via the network 110.

The hardware configuration described above implements the process function of the third embodiment. The apparatuses of the first and second embodiments may also be implemented using the same hardware as the server 10 of FIG. 4.

The server 10 may implement the process function of the second embodiment by executing the program stored on a computer-readable recording medium. The program describing the contents of the process to be executed by the server 10 may be recorded on a variety of recording media. For example, the program to be executed by the server 10 may be stored on the HDD 103. The processor 101 loads at least part of the program from the HDD 103 to the memory 102 to execute the program. The program to be executed by the server 10 may also be stored on a portable recording medium, such as the optical disk 204, the memory device 205, or the memory card 207. The program stored on the portable recording medium becomes executable after being installed onto the HDD 103 under the control of the processor 101. Alternatively, the processor 101 may directly read the program from the portable recording medium to execute the program.

Figure 5:
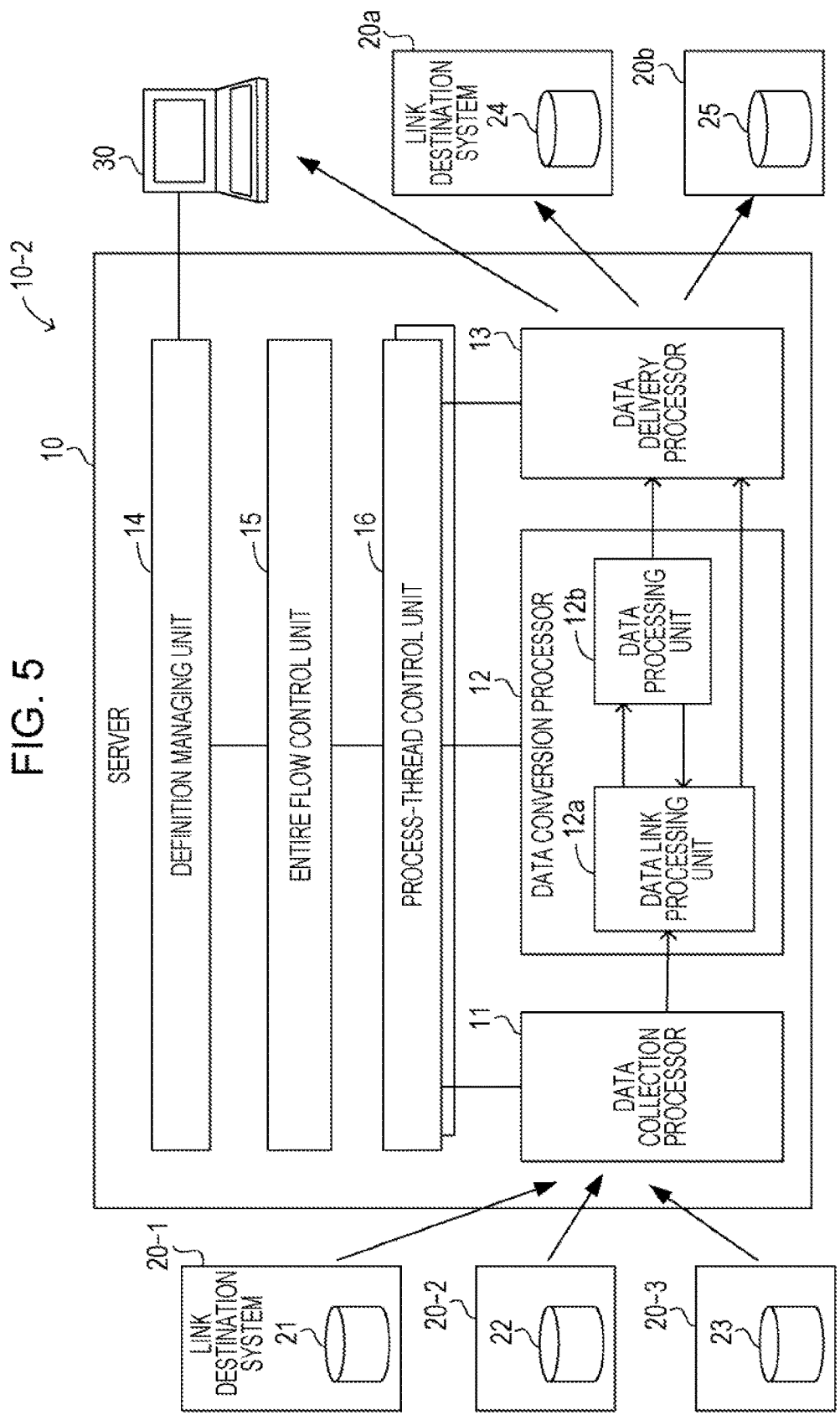
FIG. 5 is a diagram illustrating an example of functions of a server, according to an embodiment.

FIG. 5 is a block diagram illustrating an example of the function of the server 10 to be used in the third embodiment. An ETL system 10-2 includes the server 10, link destination systems 20-1 through 20-3, link destination systems 20a and 20b, and client apparatus 30. The server 10 is connected to the link destination systems 20-1 through 20-3, the link destination systems 20a and 20b, and the client apparatus 30. The link destination systems 20-1 through 20-3, and 20a and 20b respectively include databases 21 through 25.

The server 10 includes a data collection processor 11, a data conversion processor 12, a data delivery processor 13, a definition managing unit 14, an entire flow control unit 15, and a process-thread control unit 16.

The data conversion processor 12 includes a data link processing unit 12a and a data processing unit 12b. Each block may be implemented using a hardware circuit that implements the function thereof.

The data collection processor 11 collects data (or files) stored on the databases 21 through 23 of the link destination systems 20-1 through 20-3.

The data link processing unit 12a performs a data link process of multiple pieces of data collected by the data collection processor 11 (collected data or data whose collection is in progress).

When the data link process alone is performed as the data conversion process, the data link processing unit 12a outputs data link results to the data delivery processor 13. When a data processing process is to be performed as the data conversion process subsequent to the data linking, the data link processing unit 12a outputs the data link results to the data processing unit 12b.

The data processing unit 12b performs a predetermined processing process (calculate, aggregate, sort, and other operations) on the data linked by the data link processing unit 12a.

When the data conversion process is completed with the executed data processing process, the data processing unit 12b outputs the data processing results to the data delivery processor 13.

When the data processing process is followed by another data linking process, the data processing unit 12b outputs the data processing results to the data link processing unit 12a. The data link processing unit 12a performs the data link process to link the data processed by the data processing unit 12b to the data collected by the data collection processor 11 (collected data or data whose collection is in progress).

The data delivery processor 13 stores on the internal database thereof the data having undergone the data conversion process and having been output by the data conversion processor 12, and delivers the data to each of the link destination systems 20a and 20b. Also in response to a user's request, the data delivery processor 13 outputs the data to the client apparatus 30.

The definition managing unit 14 generates and manages metadata in accordance with the definition specified by the client apparatus 30 (a specific example of the metadata is described below with reference to FIGS. 14 and 17A through 17C).

The entire flow control unit 15 controls the entire flow of ETL. For example, the entire flow control unit 15 dynamically configures the process flow, monitors the data collection status, produces a list for use in the data conversion process, and analyzes the definition.

The process-thread control unit 16 controls process and thread when the data collection process, the data conversion process, or the data delivery process is performed. For example, the process-thread control unit 16 dynamically performs configuration control, for example, interrupts the process-thread process, determines whether to perform the data link process by multiple rounds, configures the number of rounds if the data link process is performed by multiple rounds, and changes the execution order of the data processing process.

The ETL operation of the server 10 is described in detail. The following discussion is based on the premise that an input source supplies a single piece of journal data and two pieces of master data. In a first case, the server 10 outputs the result data through multiple segmented data link processes without performing the data processing process.

Figure 6:
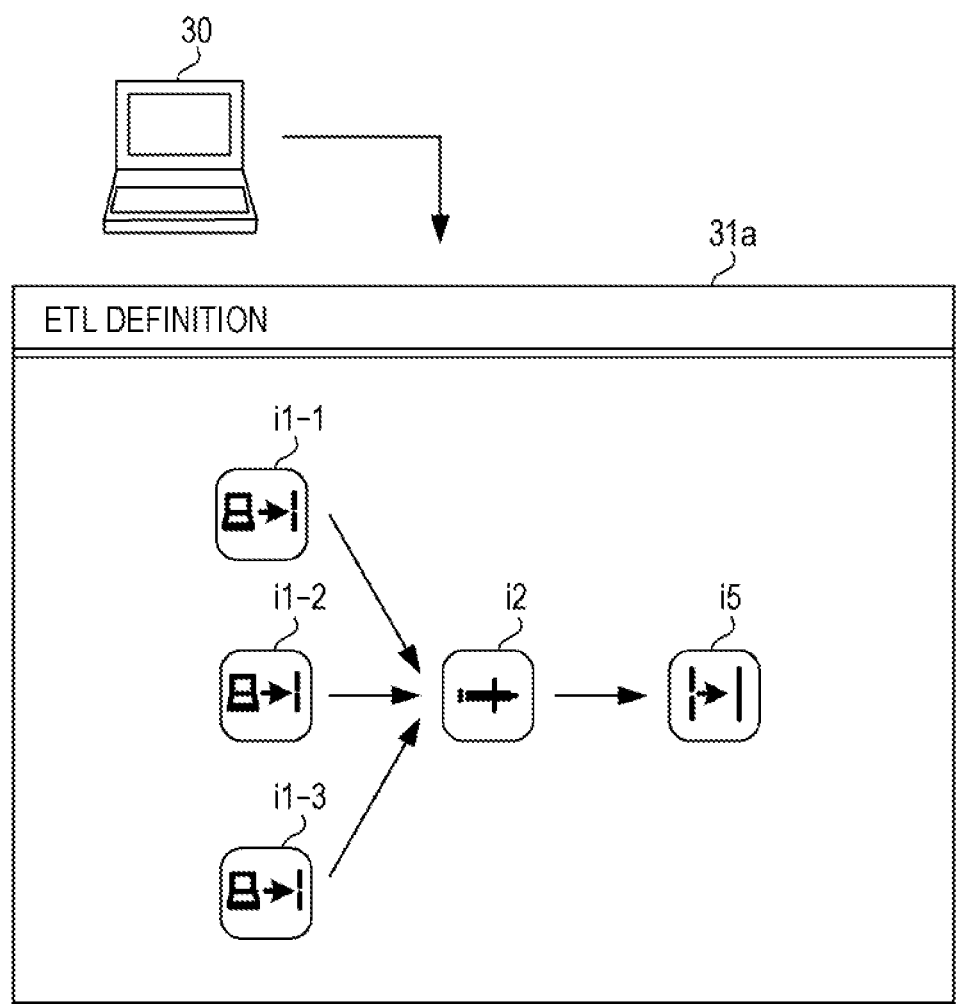
FIG. 6 is a diagram illustrating an example of a definition screen of ETL, according to an embodiment.

FIG. 6 illustrates an example of a definition screen of ETL. A screen 31a of the client apparatus 30 displays a graphical user interface (GUI) that defines the data link process of the single piece of journal data and the two pieces of master data.

An icon i1-1 represents the journal data, and icons i1-2 an i1-3 respectively represent master data. An icon i2 represents the data link process, and an icon IS represents a data load process (including storage and delivery).

Figure 7A:
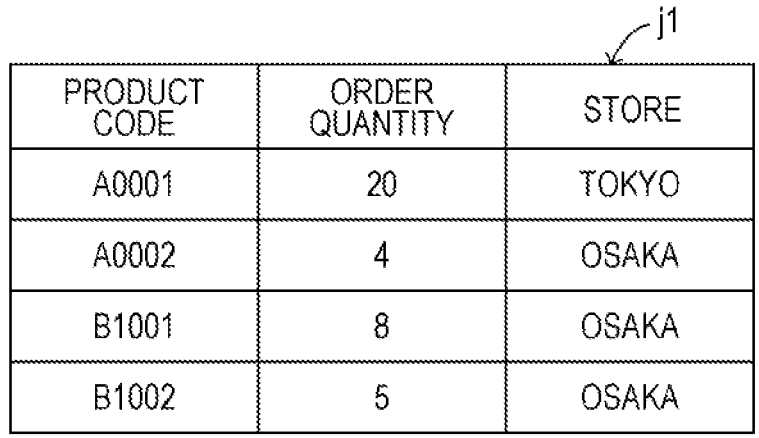
FIGS. 7A to 7C are diagrams each illustrating an example of data serving as a link process target, according to an embodiment.
Figure 7B:
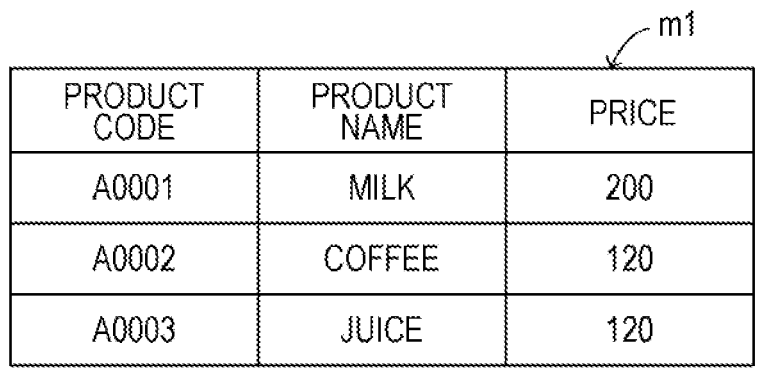
Figure 7C:
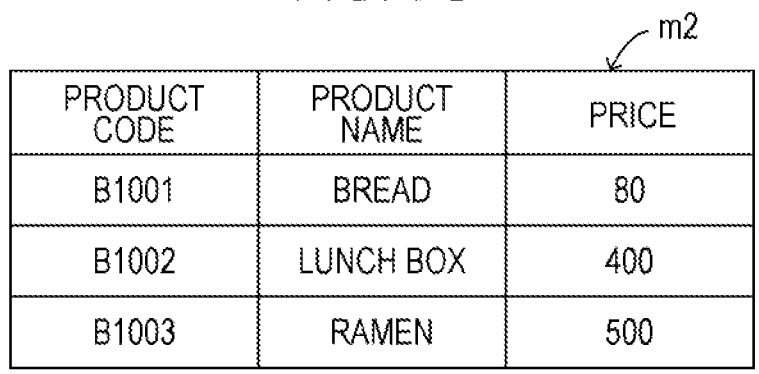

FIGS. 7A through 7C illustrate examples of data serving as a link process target. Journal data j1 includes item entries for "PRODUCT CODE", "ORDER QUANTITY", and "STORE". Referring to FIG. 7A, the journal data j1 includes data (PRODUCT CODE, ORDER QUANTITY, STORE)= (A0001, 20, TOKYO), (A0002, 4, OSAKA), (B1001, 8, OSAKA), and (B1002, 5, OSAKA).

The master data m1 and m2 include item entries for "PRODUCT CODE", "PRODUCT NAME", and "PRICE". Referring to FIGS. 7B and 7C, the master data m1 includes data (PRODUCT CODE, PRODUCT NAME, PRICE)= (A0001, MILK, 200), (A0002, COFFEE, 120), and (A0003, JUICE, 120). The master data m2 includes data (PRODUCT CODE, PRODUCT NAME, PRICE)=(B1001, BREAD, 80), (B1002, LUNCH BOX, 400), and (B1003, RAMEN, 500).

Figure 8:
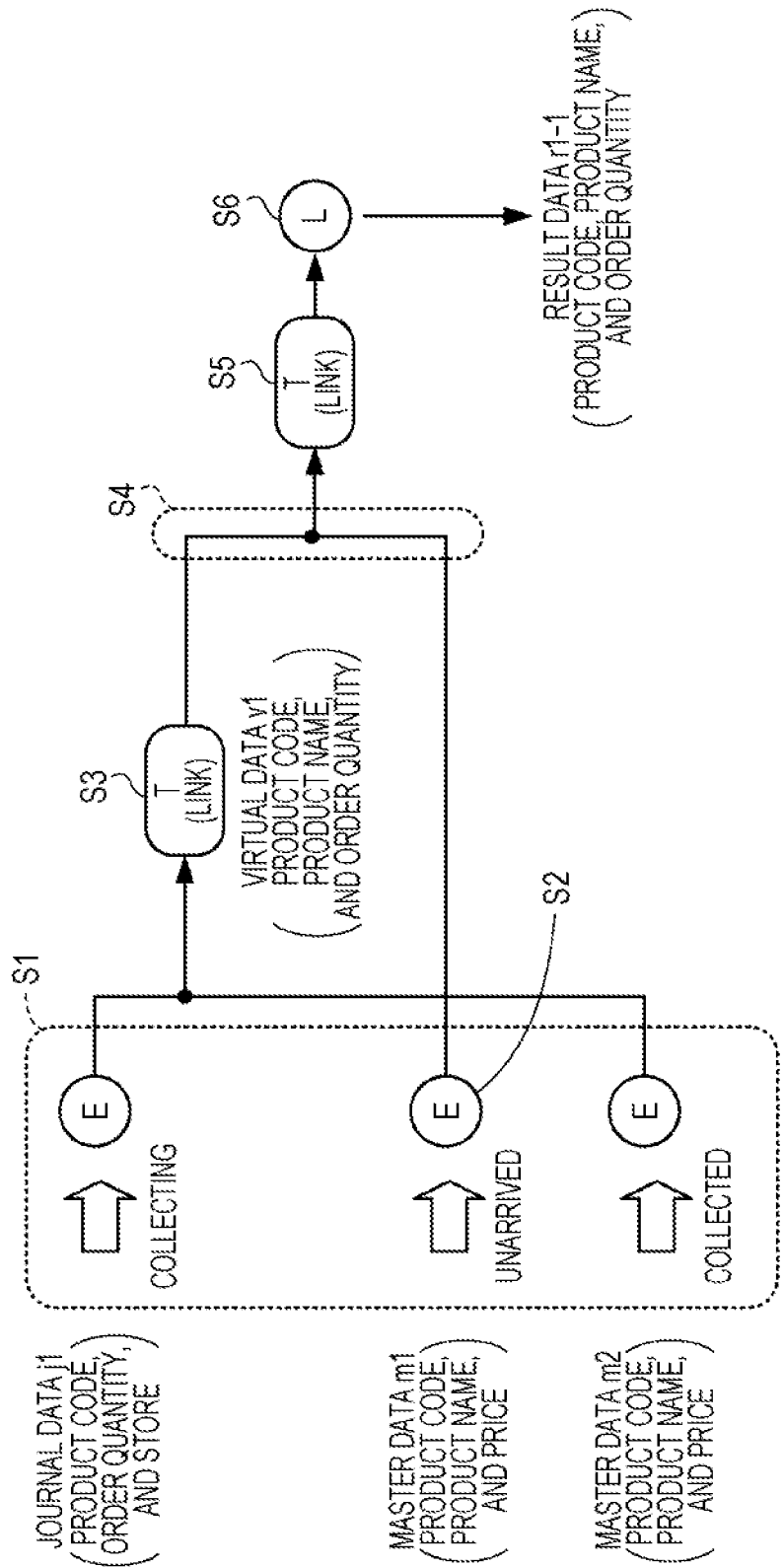
FIG. 8 is a diagram illustrating an example of an operation of ETL, according to an embodiment.

FIG. 8 illustrates an example of an operation of ETL. As illustrated in FIG. 8, a product name is acquired from the data having undergone the data link process, according to a key that is a product code included in the data as a link target.

Step S1 The data collection processor 11 recognizes the arrival status of the data to be collected. In the example of FIG. 8, the data collection processor 11 recognizes that the journal data j1 is being collected, that the master data m1 has not yet arrived, and that the master data m2 has been collected.

Step S2 When any data has not yet arrived, the process-thread control unit 16 configures the data link process to be repeated by multiple rounds, and instructs the data link processing unit 12a to perform the data link process by the multiple rounds. In this case, the master data m1 from among the three pieces of the data has not yet arrived, and the data link process may be performed on the journal data j1 and the master data m2 in advance. The process-thread control unit 16 thus repeats the data link process by two rounds.

Step S3 In a first-round data link process, the data link processing unit 12a performs the data link process by handling the collected data and the collecting data as link target data. The link results are stored as virtual data (intermediate data) on an internal memory.

The data link processing unit 12a performs data reading on the collecting data through the pipeline process. The data link processing unit 12a reads the collecting data through the pipeline process, and data-links a portion of the data that is read first to the collected data, thereby speeding up the link process.

In the example of FIG. 8, the data link processing unit 12a reads the journal data j1 in the course of collecting, through the pipeline process, while generating virtual data v1 by linking the read portion of the journal data j1 to the collected master data m2. The virtual data v1 is stored on the internal memory.

Figure 9:
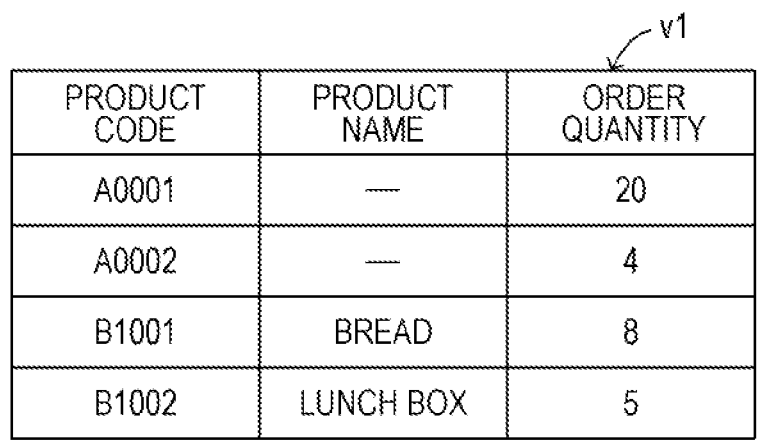
FIG. 9 is a diagram illustrating an example of virtual data, according to an embodiment.

FIG. 9 illustrates an example of the virtual data v1. The virtual data v1 includes item entries "PRODUCT CODE", "PRODUCT NAME", and "ORDER QUANTITY". The virtual data v1 is data whose data conversion process is in progress. In the example of FIG. 9, the virtual data v1 includes data (PRODUCT CODE, PRODUCT NAME, ORDER QUANTITY)=(A0001, -, 20), (A0002, -, 4), (B1001, BREAD, 8), and (B1002, LUNCH BOX, 5). A blank indicated by the symbol "-" indicates that the data at the corresponding item entry has not been collected, because the master data m1 has not yet arrived.

Step S4 The data link processing unit 12a suspends the data link process until the link results (virtual data) are output after one piece of data read through the pipeline process is linked to the other data, or until the lately arrived data is collected. In the example of FIG. 8, the data link processing unit 12a suspends the data link process until the virtual data v1 is output or until the master data m1 is collected.

Step S5 The data link processing unit 12a changes the target data that is to be read through the pipeline process, depending on the output status of the virtual data, and the collection status of the other data to be linked to the virtual data. The data link processing unit 12a performs a second-round data link process to link the other data to the virtual data.

In the example of FIG. 8, the data link processing unit 12a changes the target data that is to be read through the pipeline process, depending on the output status of the virtual data v1, and the collection status of the master data m1, and then performs the data link process on the virtual data v1 and the master data m1.

More specifically, when the outputting of the virtual data v1 has completed, and the master data m1 is in the course of collecting, the data link processing unit 12a reads the master data m1 through the pipeline process, and then links the virtual data v1 and the master data m1.

When the virtual data v1 is being output, and the collection of the master data m1 has completed, the data link processing unit 12a reads the journal data j1 in the course of collecting, through the pipeline process, and then links the virtual data v1 and the master data m1.

Step S6 The data delivery processor 13 delivers result data r1-1 output from the data link processing unit 12a.

Figure 10:
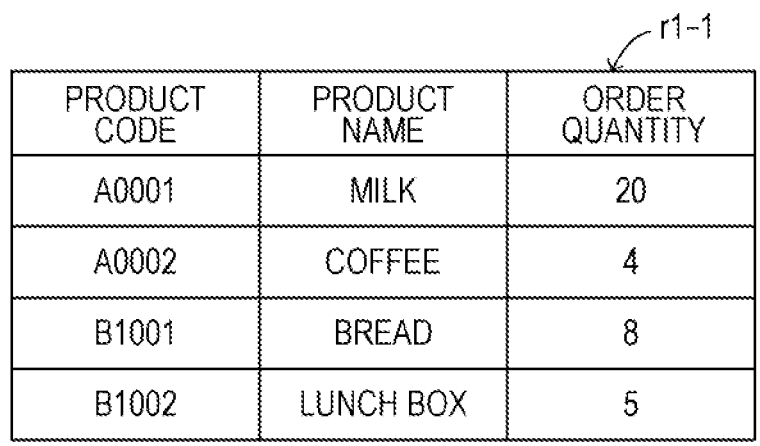
FIG. 10 is a diagram illustrating an example of result data, according to an embodiment.

FIG. 10 illustrates an example of the result data r1-1. The result data r1-1 includes item entries "PRODUCT CODE", "PRODUCT NAME", and "ORDER QUANTITY". The result data r1-1 is data having undergone the data conversion process. In the example of FIG. 10, the result data r1-1 includes data (PRODUCT CODE, PRODUCT NAME, ORDER QUANTITY)=(A0001, MILK, 20), (A0002, COFFEE, 4), (B1001, BREAD, 8), and (B1002, LUNCH BOX, 5).

In related art techniques, the data link process is performed by one time after all the journal data j1, the master data m1, and the master data m2 have been collected. In contrast, the server 10 performs the data link process by several rounds. The server 10 performs the data link process on the data that is eligible for the link process in advance.

In the above example, for example, the master data m1 has not yet arrived. The server 10 duplicates the data link process, and performs a first-round data link process on the journal data j1 and the master data m2, which have arrived. In a second-round data link process, the server 10 links the master data m1 to the results of the first-round data link process.

When one piece of data has been collected, the server 10 links to the collected piece of the data, another piece of the data being collected while reading the other piece of the data through the pipeline process even if the collection of the other piece of the data is in progress.

By performing the data link process by several rounds in view of the collection status of data, the server 10 advances the start timing of the data link process. Since the reading method (the pipeline process) is changed in view of the collection status of the data, the entire data link process is increased in speed.

The data processing process is performed after completing multiple data link processes, and the result data is then output. This operation is described below.

Figure 11:
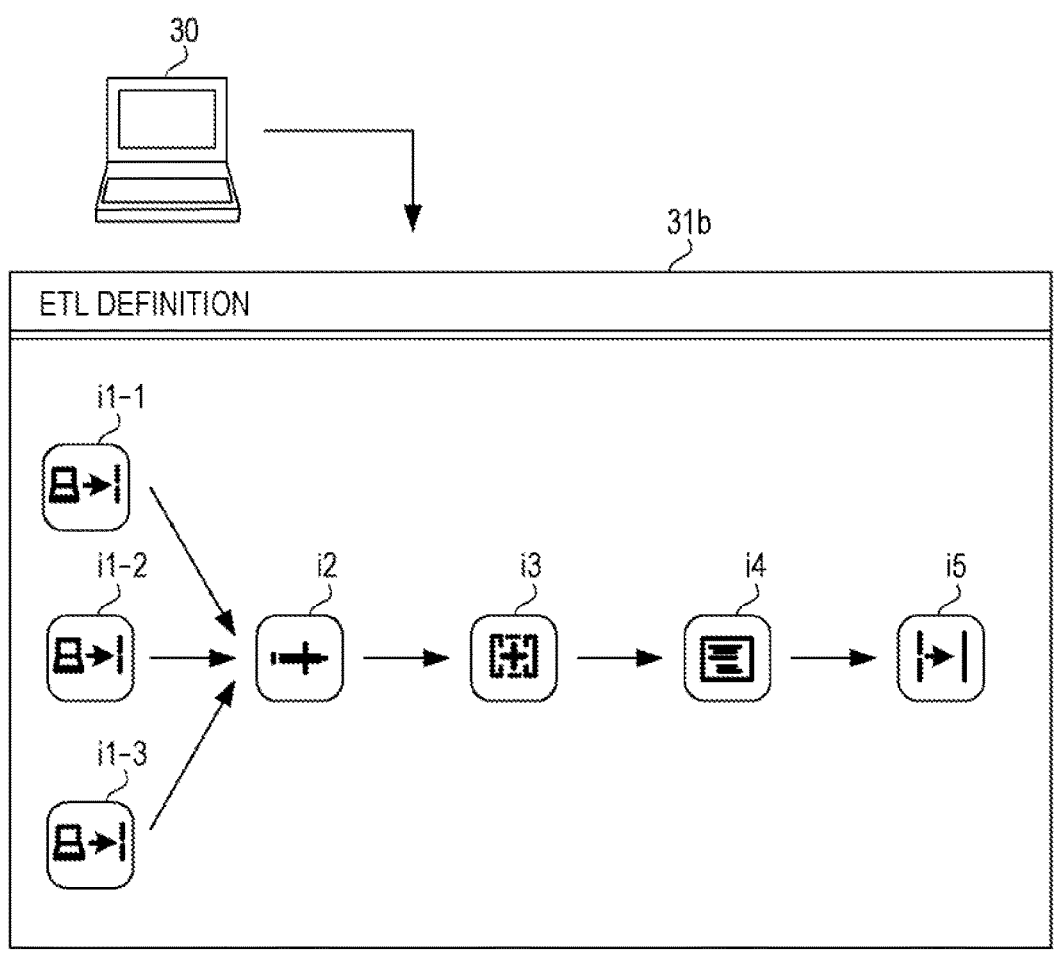
FIG. 11 is a diagram illustrating an example of a definition screen of ETL, according to an embodiment.

FIG. 11 illustrates an example of a definition screen of ETL. A screen 31b of the client apparatus 30 displays a GUI that defines the data link process for a single piece of journal data and two pieces of master data, and the data processing process (calculate and aggregate) subsequent to the data link process.

Icons i3 and i4 are further added to the screen of FIG. 6. The icon i3 represents a calculate process as a data processing process, and the icon IS represents an aggregate process as a data processing process. The other icons remain unchanged from those illustrated in FIG. 6.

Figure 12A:
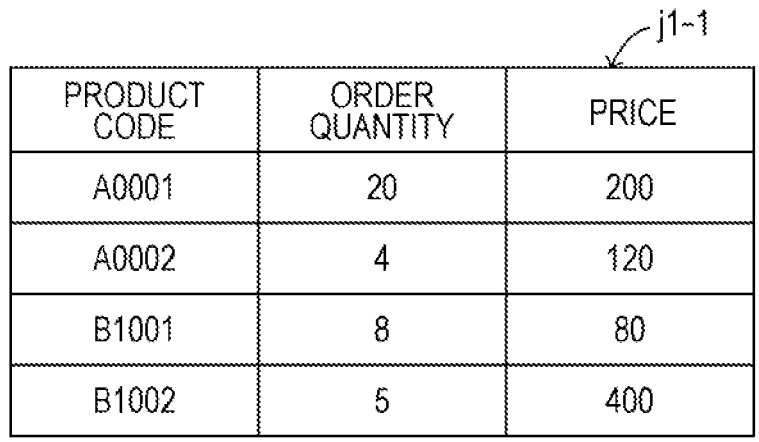
FIGS. 12A to 12C are diagrams each illustrating an example of data serving as a link process target, according to an embodiment.
Figure 12B:
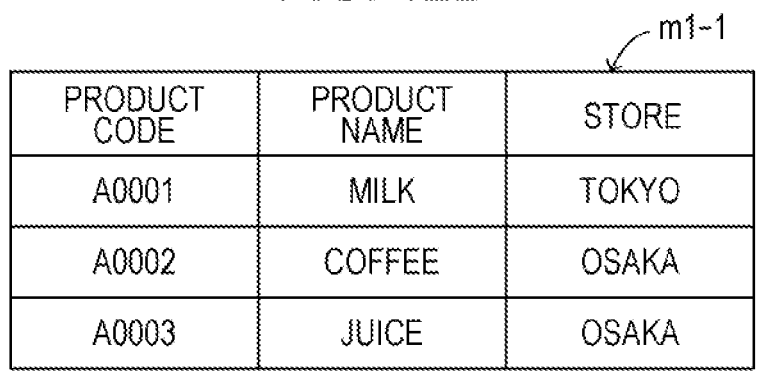
Figure 12C:
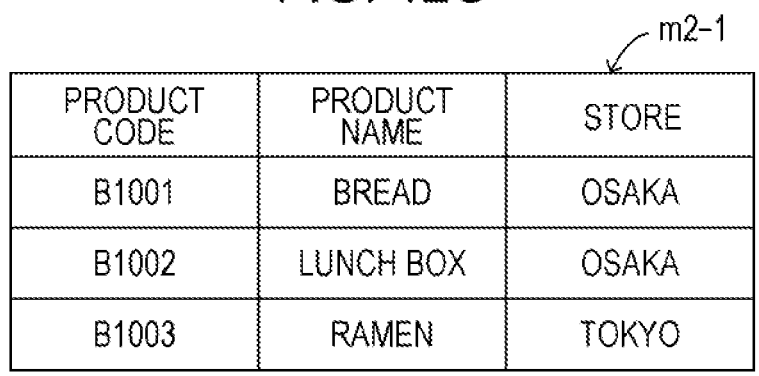

FIGS. 12A through 12C illustrate examples of data serving as a link process target. Journal data j1-1 includes item entries "PRODUCT CODE", "ORDER QUANTITY", and "PRICE". In the example of FIG. 12A, the journal data j1-1 lists data (PRODUCT CODE, ORDER QUANTITY, PRICE)=(A0001, 20, 200), (A0002, 4, 120), (B1001, 8, 80), and (B1002, 5, 400).

The master data m1-1 and m2-1 respectively include item entries "PRODUCT CODE", "PRODUCT NAME", and "STORE". In the example of FIG. 12B, the master data m1-1 lists data (PRODUCT CODE, PRODUCT NAME, STORE) =(A0001, MILK, TOKYO), (A0002, COFFEE, OSAKA), and (A1003, JUICE, OSAKA). In the example of FIG. 12C, the master data m2-1 lists data (PRODUCT CODE, PRODUCT NAME, STORE)=(B0001, BREAD, OSAKA), (B0002, LUNCH BOX, OSAKA), and (B1003, RAMEN, TOKYO).

Figure 13:
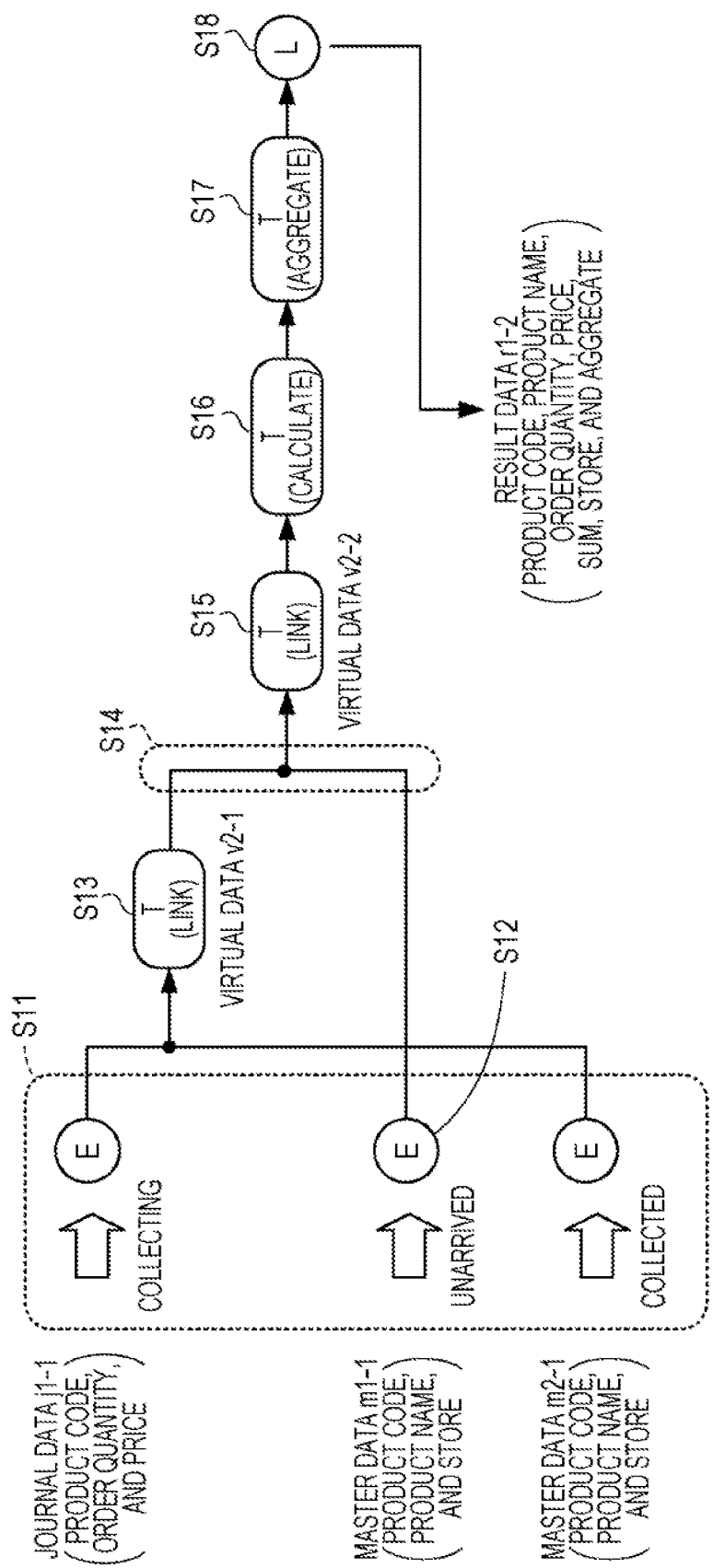
FIG. 13 is a diagram illustrating an example of an operation of ETL, according to an embodiment.

FIG. 13 illustrates an example of the operation of ETL. In the operation illustrated in FIG. 13, information concerning a product name and a store is acquired according to a product name as a key, and the sum and the aggregate on each store are output.

Step S11 The data collection processor 11 collects data, and recognizes that the journal data j1-1 is in the course of collecting, that the master data m1-1 has not yet arrived, and that the master data m2-1 has been collected.

Step S12 The master data m1-1 from among the three pieces of data has not yet arrived. The process-thread control unit 16 instructs the data link processing unit 12a to perform the data link process by two rounds such that the data link process is performed on the journal data j1-1 and the master data m2-1 in advance.

Step S13 The data link processing unit 12a performs the data link process on the collected master data m2-1 and the journal data j1-1 whose collection is in progress, thereby generating virtual data v2-1. The journal data j1-1 is being read through the pipeline process and then data-linked.

Step S14 The data link processing unit 12a suspends the data link process until the outputting of the virtual data v2-1 has completed or until the master data m1-1 has been collected.

Step S15 When the outputting of the virtual data v2-1 has completed, and the master data m1-1 is in the course of collecting, the data link processing unit 12a reads the master data m1-1 through the pipeline process, and then links the master data m1-1 to the virtual data v2-1.

When the virtual data v2-1 is in the course of outputting, and the collection of the master data m1-1 has completed, the data link processing unit 12a reads the journal data j1-1 in the course of collecting, through the pipeline process, and links the master data m1-1 to the virtual data v2-1.

Step S16 The data processing unit 12b receives virtual data v2-2 that is linked in the second-round data link process by the data link processing unit 12a, and sums the virtual data v2-2 in the calculate process.

Step S17 The data processing unit 12b aggregates the results of the calculate process performed on the virtual data v2-2 on a per store basis in the aggregate process.

Step S18 The data delivery processor 13 delivers result data r1-2 output from the data processing unit 12b.

FIG. 14 illustrates an example of the result data r1-2. The result data r1-2 includes item entries "PRODUCT CODE", "PRODUCT NAME", "ORDER QUANTITY", "PRICE", "SUM", "STORE", and "AGGREGATE".

In the example of FIG. 14, the result data r1-2 lists data (PRODUCT CODE, PRODUCT NAME, ORDER QUANTITY, PRICE, SUM, STORE)=(A0001, MILK, 20, 200, 4000, TOKYO), (A0002, COFFEE, 4, 120, 480, OSAKA), (B1001, BREAD, 8, 80, 640, OSAKA), and (B1002, LUNCH BOX, 5, 400, 2000, OSAKA). The result data r1-2 also lists (STORE, AGGREGATE)=(TOKYO, 4000), and (OSAKA, 3120) as the total sum of each store.

In the following discussion, the data link process is performed by multiple rounds, and then the data processing process is performed, where the execution order of the data processing process is dynamically modified, based on defined metadata. First, description will be given of a case where, based on the contents of the metadata, the data processing process to be performed is performed after all the data link processes are complete.

Figure 15:
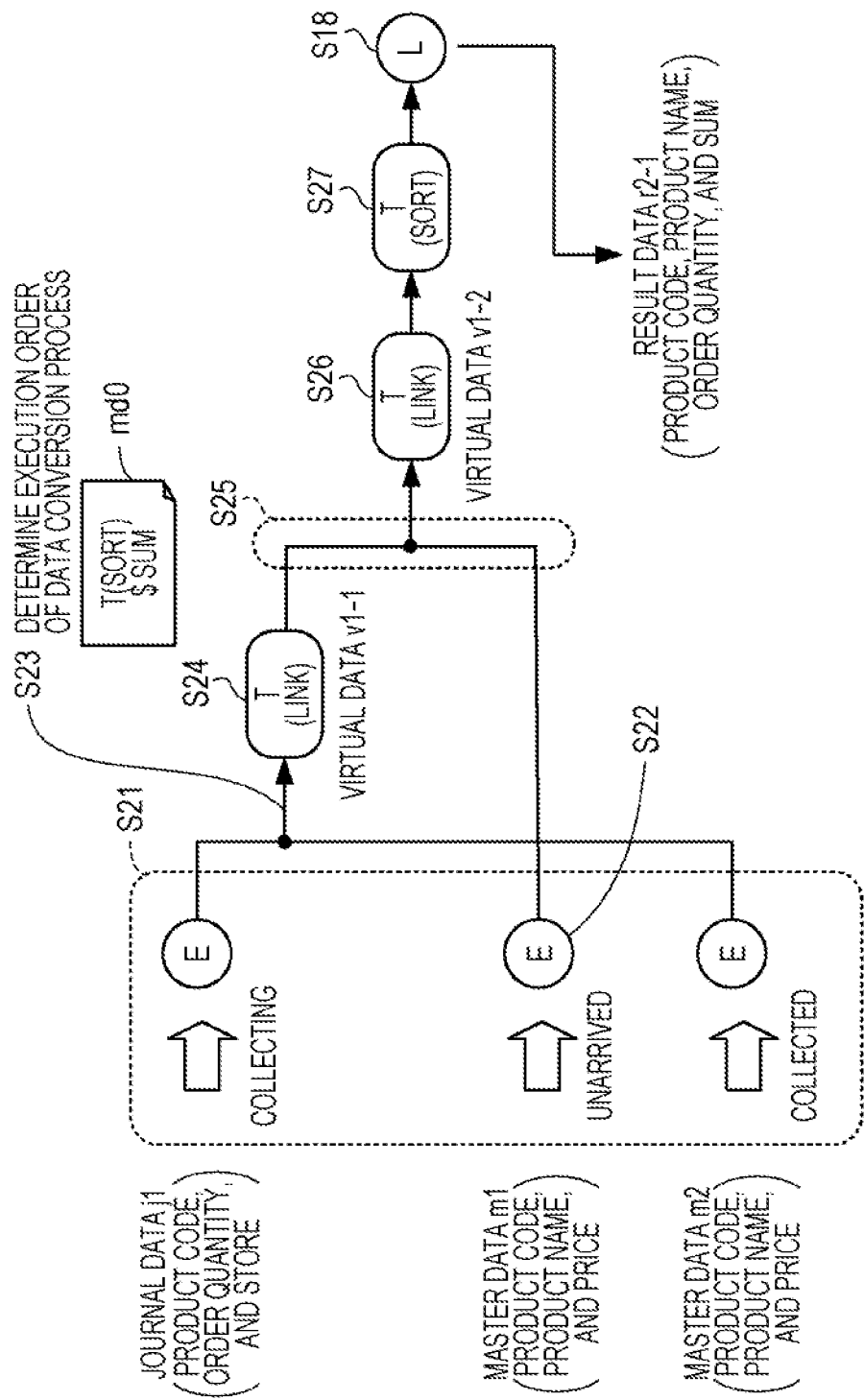
FIG. 15 is a diagram illustrating an example of an operation of ETL, according to an embodiment.

FIG. 15 illustrates the operation of ETL. In the example of FIG. 15, the result data is sorted by the total sum after the data link process is performed. The input source includes the journal data j1, and the master data m1 and m2 in a similar way as illustrated in FIGS. 7A through 7C.

Step S21 The data collection processor 11 recognizes the arrival status of the data to be collected. In the example of FIG. 15, the data collection processor 11 recognizes that the journal data j1 is in the course of collecting, that the master data m1 has not yet arrived, and that the master data m2 has been collected.

Step S22 When there exists data that has not yet arrived, the process-thread control unit 16 configures the data link process to be repeated by multiple rounds, and notifies the data link processing unit 12a of the number of rounds of the data link process.

Since the master data m1 has not yet arrived from among the three pieces of the data in the example of FIG. 15, the process-thread control unit 16 instructs the data link processing unit 12a to perform the data link process by two rounds such that the journal data j1 and the master data m2 are linked in advance of the master data m1.

Step S23 The process-thread control unit 16 references metadata managed by the definition managing unit 14 and determines whether any data processing process (calculate, summing, sorting or the like) is to be performed on the arrived data.

When a data processing process is to be performed, the process-thread control unit 16 determines in accordance with the contents of the metadata whether a data processing process is executable in the middle of multiple-round data link processes.

When the process-thread control unit 16 determines that the data processing process is executable in the middle of the multiple-round data link processes, the process-thread control unit 16 configures the data processing process to be inserted in the middle of the multiple-round data link processes. In this case, the data processing process is inserted to be performed subsequent to the data link process at which information to perform the data processing process is collected.

When the process-thread control unit 16 determines that the data processing process is un-executable in the middle of the multiple-round data link processes, the process-thread control unit 16 configures the data processing process to be performed after all the data link processes have been completed.

An operation in step S23 is described with reference to FIG. 15. The definition managing unit 14 manages metadata md0 that defines "sort".

The process-thread control unit 16 references the metadata md0 managed by the definition managing unit 14, and recognizes that "sort" is to be performed as a data conversion process. The metadata md0 also defines "sort" by the total sum.

The process-thread control unit 16 recognizes that the sorting by the total sum is required to be performed only after all the data is collected. The process-thread control unit 16 thus determines that the data processing process (sort) is to be performed after the data link process is performed on the journal data j1, and the master data m1 and m2.

Step S24 The data link processing unit 12a performs the data link process on the master data m2 that has been collected, and the journal data j1 that is in the course of collecting, thereby generating virtual data v1-1. Note that the journal data j1 is read through the pipeline process and then data-linked.

Step S25 The data link processing unit 12a waits on standby until the outputting of the virtual data v1-1 is completed or until collection of the master data m1 is completed.

Step S26 When the outputting of the virtual data v1-1 completed, and the master data m1 is in the course of collecting, the data link processing unit 12a reads the master data m1 through the pipeline process, and links the master data m1 and the virtual data v1-1.

When the virtual data v1-1 is in the course of outputting, and the master data m1 have been collected, the data link processing unit 12a reads the journal data j1 in the course of collecting, through the pipeline process, and links the virtual data v1-1 and the master data m1.

Step S27 The data processing unit 12b receives virtual data v1-2 that are results of a second-round data link process performed by the data link processing unit 12a, and sorts the results by the total sum in the calculate process.

Step S28 The data delivery processor 13 delivers result data r2-1 output from the data processing unit 12b.

Figure 16:
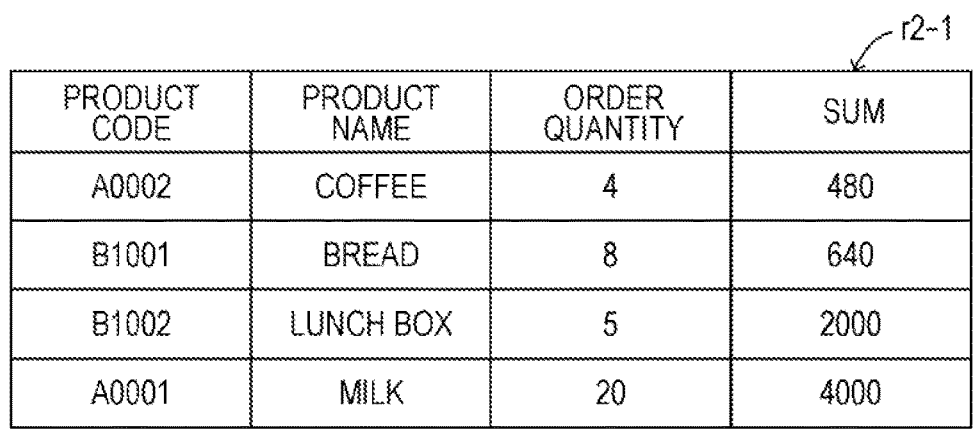
FIG. 16 is a diagram illustrating an example of result data, according to an embodiment.

FIG. 16 illustrates an example of the result data r2-1. The result data r2-1 includes item entries "PRODUCT CODE", "PRODUCT NAME", "ORDER QUANTITY", "SUM". In the example of FIG. 16, the result data r2-1 lists data (PRODUCT CODE, PRODUCT NAME, ORDER QUANTITY, SUM)=(A0002, COFFEE, 4, 480), (B1001, BREAD, 8, 640), (B1002, LUNCH BOX, 5, 2000), and (A0001, MILK, 20, 4000), and is sorted according to the order of the amount of sums.

In the following discussion, the data processing process is performed in the middle of the data link processes in accordance with the contents of the metadata.

Figure 17A:
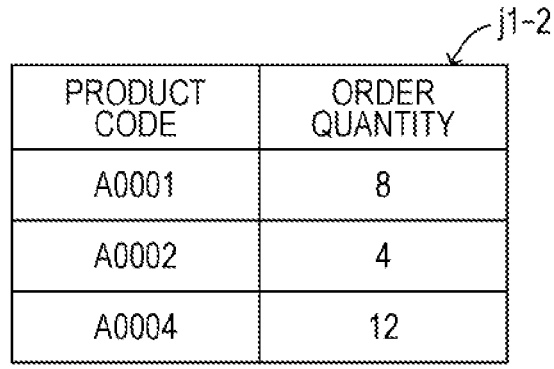
FIGS. 17A to 17C are diagrams each illustrating an example of data serving as a link process target, according to an embodiment.
Figure 17B:
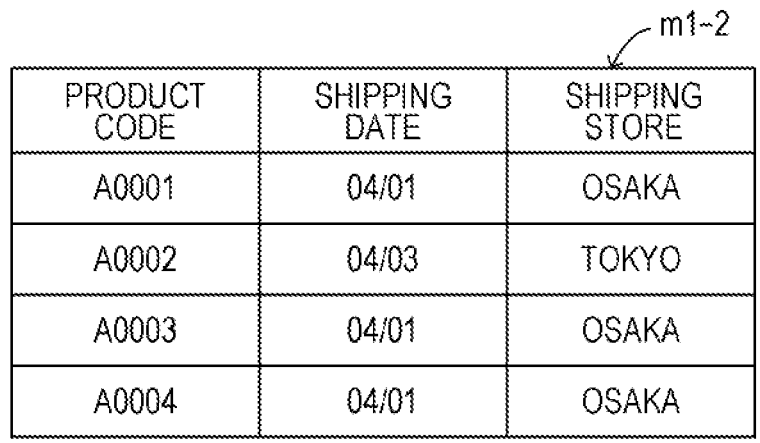
Figure 17C:
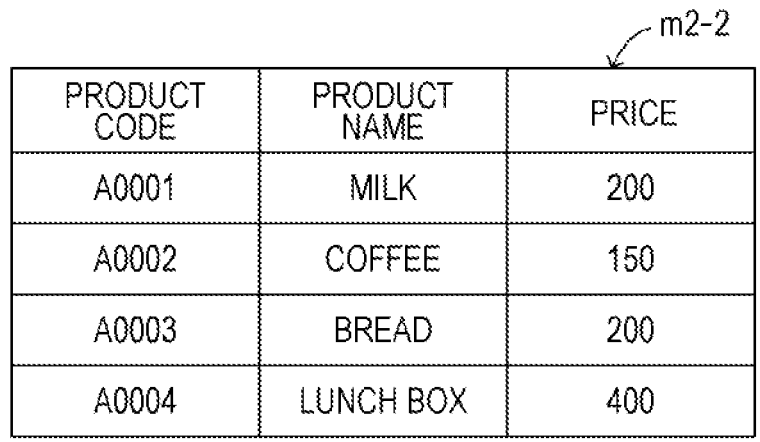

FIGS. 17A through 17C illustrate examples of data serving as a link process target. Journal data j1-2 includes item entries "PRODUCT CODE", and "ORDER QUANTITY". In the example of FIG. 17A, the journal data j1-2 lists data (PRODUCT CODE, ORDER QUANTITY)=(A0001, 8), (A0002, 4), and (A0004, 12).

Master data m1-2 includes item entries "PRODUCT CODE", "SHIPPING DATE", and "SHIPPING STORE". In the example of FIG. 17A, the master data m1-2 lists data (PRODUCT CODE, SHIPPING DATE, SHIPPING STORE)=(A0001, 04/01, Osaka), (A0002, 04/03, Tokyo), (A0003, 04/01, Osaka), and (A0004, 04/01, Osaka).

Master data m2-2 lists data (PRODUCT CODE, PRODUCT NAME, PRICE)=(A0001, MILK, 200), (A0002, COFFEE, 150), (A0003, BREAD, 200), and (A0004, LUNCH BOX, 400).

Figure 18:
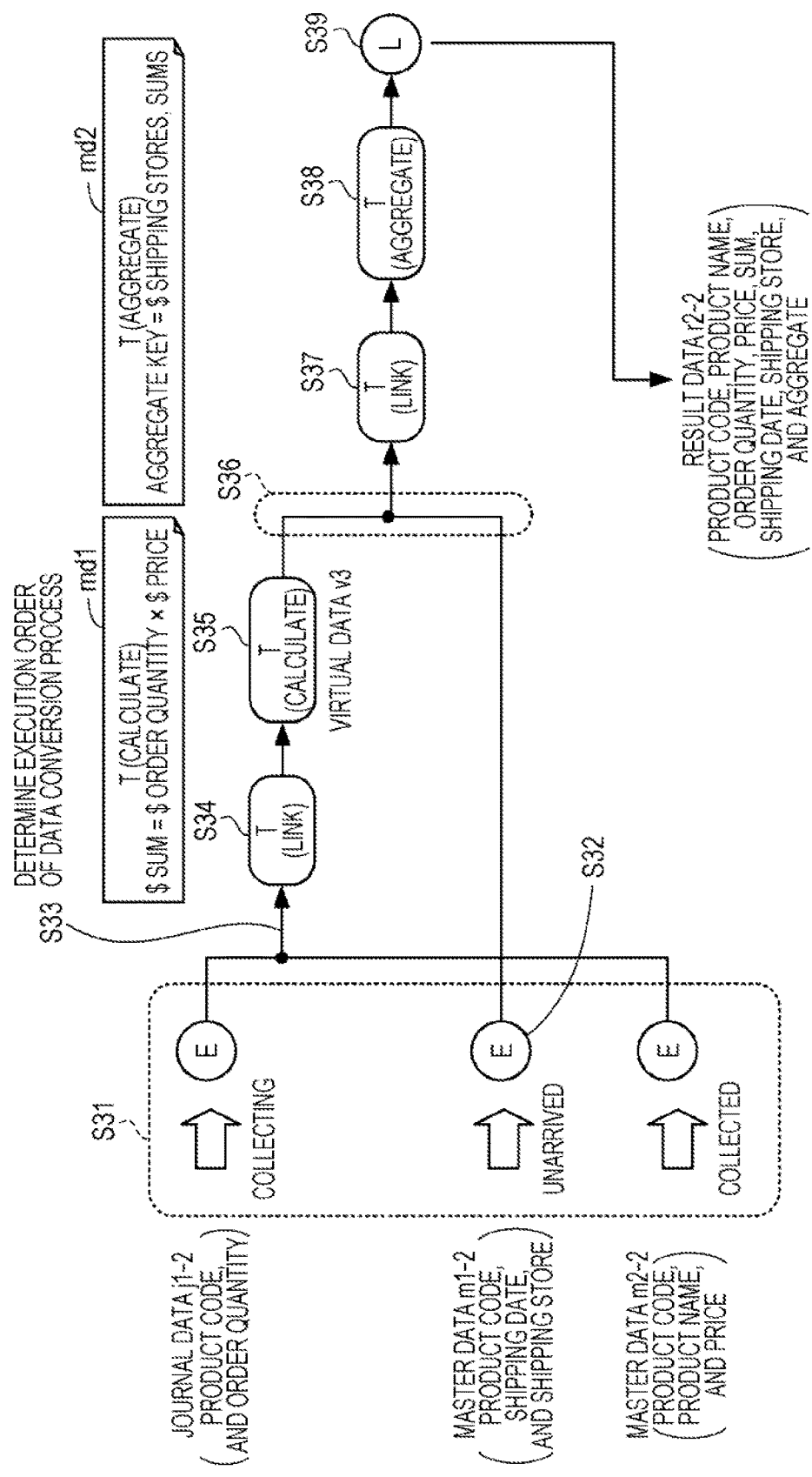
FIG. 18 is a diagram illustrating an example of an operation of ETL, according to an embodiment.

FIG. 18 illustrates an example of an operation of ETL. In the example of FIG. 18, information of product names and stores is acquired using a product code as a key, and sums and an aggregate per store are then output.

Step S31 The data collection processor 11 recognizes the arrival status of the data to be collected. Referring to FIG. 18, the data collection processor 11 recognizes that the journal data j1-2 is in the course of collecting, that the master data m1-2 has not yet arrived, and that the master data m2-2 has been collected.

Step S32 When there exists data that has not arrived, the process-thread control unit 16 configures the data link process to be performed in a multi-round mode. In the example of FIG. 18, the master data m1-2 has not yet arrived from among the three pieces of the data. The process-thread control unit 16 instructs the data link processing unit 12a to perform the data link process by two rounds such that the data link process is performed on the journal data j1-2 and the master data m2-2 in advance.

Step S33 The process-thread control unit 16 references the metadata managed by the definition managing unit 14, and determines whether there exists any data processing process (calculate, aggregate, sort or the like) that is to be performed on the collected data.

When there exists a data processing process to be performed on the collected data, the process-thread control unit 16 determines whether the data processing process is executable in the middle of the multiple-round data link processes.

Upon determining that the data processing process is executable in the middle of the multiple-round data link processes, the process-thread control unit 16 configures the data processing process to be inserted between the multiple-round data link processes. In such a case, the data processing process is inserted such that the data processing process is to be performed subsequent to the data link process for which information to execute the data processing process is collected.

Upon determining that the data processing process is unexecutable between the multiple-round data link processes, the process-thread control unit 16 configures the data processing process to be performed after all the data link processes are complete.

An operation in step S33 is described with reference to FIG. 18. The definition managing unit 14 manages metadata md1 defining "calculate", and metadata md2 defining "aggregate".

By referencing the metadata md1 and md2 managed by the definition managing unit 14, the process-thread control unit 16 recognizes that the "calculate" and the "aggregate" are performed as the data processing process.

The metadata md1 defines, as the "calculate", the sum that is obtained by multiplying the order quantity by the price (\$ SUM=\$ ORDER QUANTITY×\$ PRICE). The metadata md2 defines, as the "aggregate", an aggregate key determined from the shipping store and the sum (AGGREGATE KEY=\$ SHIPPING STORE, SUMS).

The metadata md1 indicates that the item entries to calculate the "SUM" are the "ORDER QUANTITY" and the "PRICE". The process-thread control unit 16 recognizes that the item entry "ORDER QUANTITY" is present in the journal data j1-2 that is in the course of collecting, and that the item entry "PRICE" is present in the master data m2-2 that has been collected.

Without waiting for the arrival of the master data m1-2, the process-thread control unit 16 determines that the data processing process (calculate) is executable subsequent to the first-round data link process on the journal data j1-2 and the master data m2-2.

The metadata md2 indicates that the item entries to calculate the "AGGREGATE KEY" are the "SHIPPING STORE" and the "SUM". In this case, the process-thread control unit 16 recognizes that the item entry "SHIPPING STORE" is present in the master data m1-2 but recognizes that the master data m1-2 has not yet arrived.

The process-thread control unit 16 recognizes that the data conversion process (aggregate) is to be performed after the master data m1-2 arrives, in other words, recognizes that the data processing process (aggregate) is to be performed subsequent to the second-round data link process after the arrival of the master data m1-2.

Step S34 The data link processing unit 12a performs the first-round data link process on the master data m2-2 that has been collected and the journal data j1-2 that is in the course of collecting.

Note that the data link processing unit 12a reads the journal data j1-2 in the course of collecting, through the pipeline process, and links the journal data j1-2 to the master data m2-2 in the order of reading.

Step S35 The data processing unit 12b performs a calculate process defined by the metadata md1 on the results obtained through the first-round data link process, thereby generating and storing virtual data v3 on the internal memory thereof.

FIG. 19 illustrates an example of the virtual data v3. The virtual data v3 includes item entries "PRODUCT CODE", "PRODUCT NAME", "ORDER QUANTITY", "PRICE", "SUM", "SHIPPING DATE", and "SHIPPING STORE".

The virtual data v3 is provisional data that is in the middle of the data conversion process. In the example of FIG. 19, the virtual data v3 lists data (PRODUCT CODE, PRODUCT NAME, ORDER QUANTITY, PRICE, SUM, SHIPPING DATE, SHIPPING STORE)=(A0001, MILK, 8, 200, 1600, –, –), (A0002, COFFEE, 4, 150, 600, –, –), and (A0004, LUNCH BOX, 12, 400, 4800, –, –). Here, the empty field indicated by the symbol "–" indicates that data at the corresponding item entry is not acquired because the master data m1-2 has not yet arrived.

Step S36 The data link processing unit 12a suspends the second-round data link process until the outputting of the virtual data v3 is completed or until the master data m1-2 is collected.

Step S37 The data link processing unit 12a changes the target data that is read through the pipeline process, depending on the output status of the virtual data v3 and the collection status of the master data m1-2. The data link processing unit 12a then performs the second-round data link process to link the virtual data v3 and the master data m1-2.

More specifically, when the outputting of the virtual data v3 is completed, and the master data m1-2 is in the course of collecting, the data link processing unit 12a reads the master data m1-2 through the pipeline process and links the master data m1-2 to the virtual data v3.

When the virtual data v3 is in the course of outputting, and the collection of the master data m1-2 is completed, the data link processing unit 12a reads the journal data j1-2 in the course of collecting, through the pipeline process, and links the virtual data v3 and the master data m1-2.

Step S38 The data processing unit 12b generates result data by performing the aggregate process defined by the metadata md2 on the result data that is obtained through the second-round data link process.

Step S39 The data delivery processor 13 delivers result data r2-2 output from the data processing unit 12b.

FIG. 20 illustrates an example of the result data r2-2. The result data r2-2 includes item entries "PRODUCT CODE", "PRODUCT NAME", "ORDER QUANTITY", "PRICE", "SUM", "SHIPPING DATE", "SHIPPING STORE", and "AGGREGATE".

In the example of FIG. 20, the result data r2-2 lists data (PRODUCT CODE, PRODUCT NAME, ORDER QUANTITY, PRICE, SUM, SHIPPING DATE, SHIPPING STORE)=(A0002, COFFEE, 4, 150, 600, 04/03, TOKYO), (A0001, MILK, 8, 200, 1600, 04/01, OSAKA), and (A0004, LUNCH BOX, 12, 400, 4800, 04/01, OSAKA). The result data r2-2 also lists (SHIPPING STORE, AGGREGATE)= (TOKYO, 600) and (OSAKA, 6400) as an aggregate sum per store.

As described above, the server 10 determines in accordance with the definition of the metadata whether the collected data includes an item entry, and performs the data conversion process by changing the execution order of individual processes such that the individual process is performed in advance on the data including the item entry. The start timing of the data conversion process is advanced and the processing speed of the entire data conversion process is increased.

The process of the entire flow control unit 15 from the process thereof to the startup of the process-thread control unit 16 is described with reference to a flowchart of FIG. 21.

Figure 21:
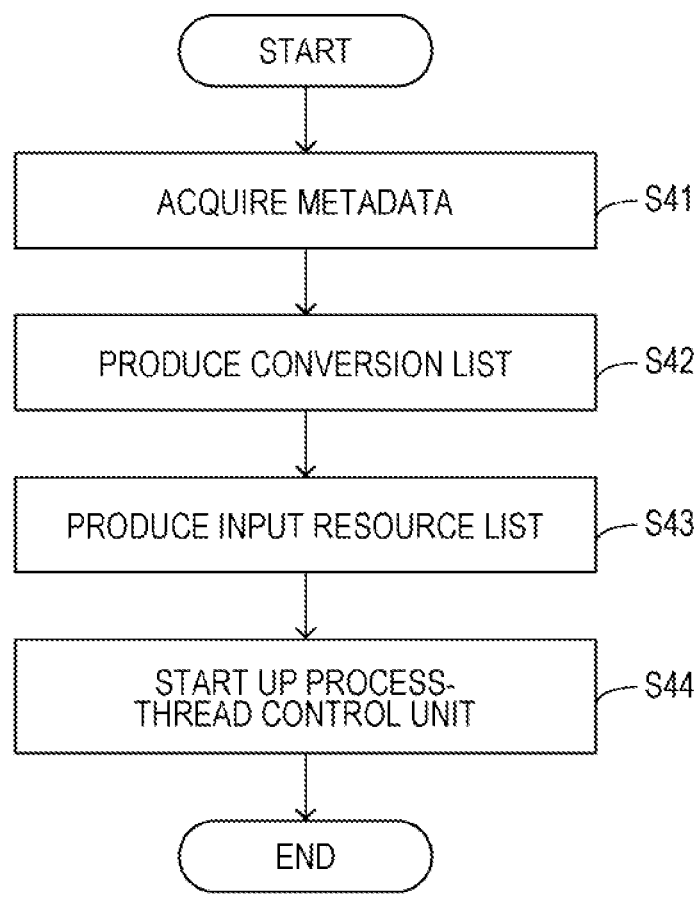
FIG. 21 is a diagram illustrating an example of an operational flowchart for a process of an entire flow control unit, according to an embodiment.

FIG. 21 is an operational flowchart illustrating the process of the entire flow control unit 15. There are a variety of patterns that triggers the process of the entire flow control unit 15. For example, the entire flow control unit 15 starts the process thereof at a reception timing of the data, or when it becomes a given timing. Also, the entire flow control unit 15 may start the process thereof in response to an execution command from the outside.

Step S41 The entire flow control unit 15 acquires from the definition managing unit 14 the metadata related to the data link target data.

Step S42 The entire flow control unit 15 recognizes the types of conversion (link, calculate, aggregate, and the like) in accordance with the contents of the acquired metadata, and produces a conversion list (will be described with reference to FIG. 22 and FIG. 23). When the conversion list is produced, the entire flow control unit 15 may produce, from information registered in the conversion list, reverse lookup information in which the entire flow control unit 15 may search for an item entry in the conversion list corresponding to the information.

Step S43 The entire flow control unit 15 produces an input source list to recognize an input status of the data (as will be described with reference to FIG. 22 and FIG. 23).

Step S44 The entire flow control unit 15 starts up the process-thread control unit 16.

Figure 23:
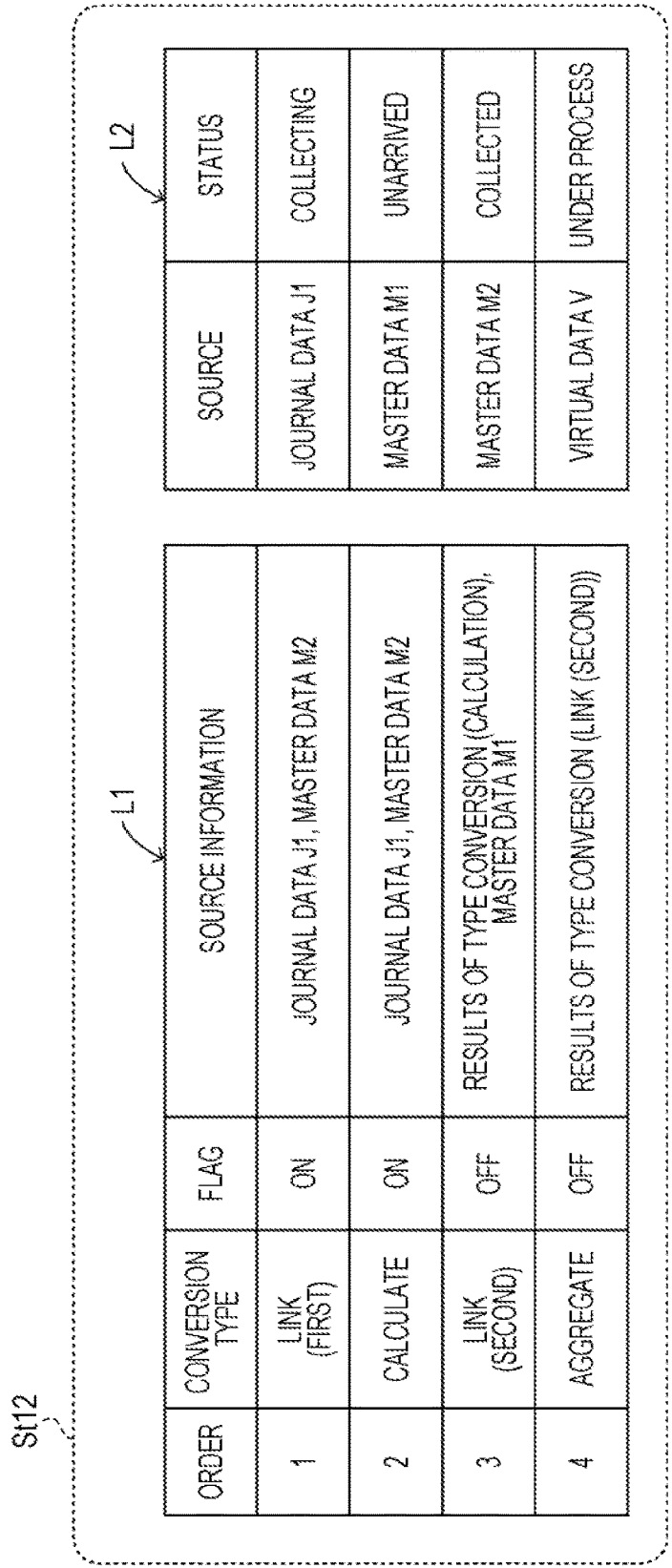
FIG. 23 is a diagram illustrating an example of a conversion list and an input source list, according to an embodiment.

FIG. 22 and FIG. 23 illustrate examples of a conversion list and an input source list. A conversion list L1 lists item entries "ORDER", "CONVERSION TYPE", "FLAG", and "SOURCE INFORMATION".

The "order" represents the order of process execution. The "conversion type" indicates conversion processes including "link", "calculate", "aggregate", or the like. The "flag" is "off" when the conversion process at the corresponding item entry is not yet performed, and is "on" when the conversion process at the corresponding item entry is performed. The "source information" represents the type of data for use in the conversion process at the corresponding item entry.

An input source list L2 includes item entries "SOURCE" and "STATUS". The "source" indicates the type of data, and the "status" indicates a collection status or a process status of data.

In status St11, the input source list L2 indicates that the journal data J1 and the master data M1 and M2 have not yet arrived. The conversion list L1 indicates that the data conversion process is performed in the order of "link", "calculate", and "aggregate".

The conversion list L1 indicates that the journal data J1 and the master data M1 and M2 are used in the "link" data conversion process, and that the journal data J1 and the master data M2 are used in the "calculate" data conversion process. The conversion list L1 also indicates that the results of the conversion type (calculate) are used in the "aggregate" data conversion process. All the "flags" are configured to be off.

In status St11, several pieces of input data have arrived, and it is determined that the data link process is performed by two rounds. Processing proceeds to status St12.

In status St12, the status item entry of the input source list L2 indicates that the journal data J1 is being collected, that the master data M1 has not yet arrived, and that the master data M2 has been collected.

The conversion list L1 is modified in the type conversion to be "link (first round)", "calculate", "link (second round)", and "aggregate". The data conversion process is performed in the order of "link (first round)", "calculate", "link (second round)", and "aggregate".

The journal data J1 and the master data M2 are used in the "link (first round)" data conversion process. With the "link (first round)" data conversion process completed, the corresponding flag is "on".

The journal data J1 and the master data M2 are used in the "calculate" data conversion process. With the "calculate" data conversion process completed, the corresponding flag is "on".

The results of the conversion type (calculate) and the master data M1 are used in the "link (second round)" data conversion process. With the "link (second round)" data conversion process not completed, the corresponding flag is "off".

With the "link (second round)" data conversion process not completed, the status in the input source list L2 indicates that the virtual data V is "under process" (when the second-round data link process is complete, the status is updated to "process complete").

The "aggregate" data conversion process uses the results of the conversion type (link (second round)). With the "aggregate" data conversion process not completed, the corresponding flag is "off".

Figure 24:
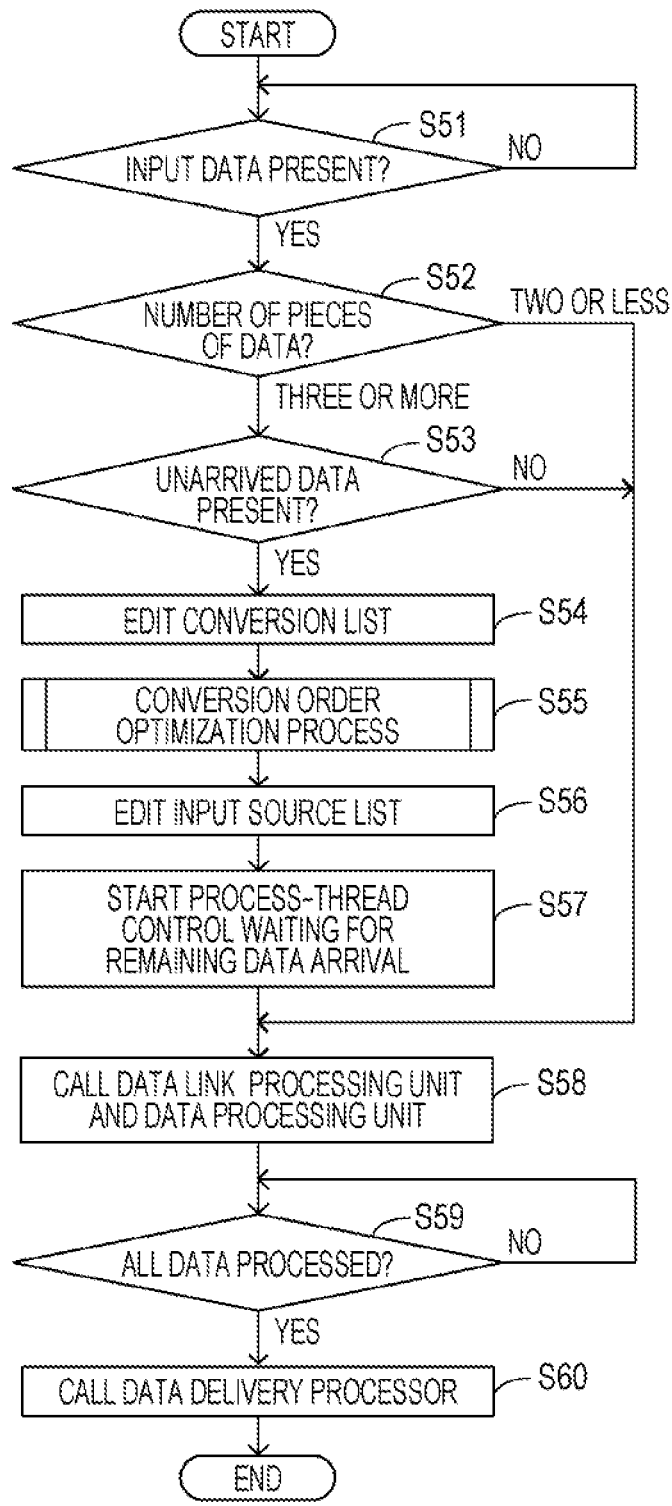
FIG. 24 is a diagram illustrating an example of an operational flowchart for a process of a process-thread control unit, according to an embodiment.

The process of the process-thread control unit 16 is described with reference to a flowchart of FIG. 24. FIG. 24 is an operational flowchart illustrating a process performed by the process-thread control unit 16.

Step S51 The process-thread control unit 16 recognizes the presence or absence of input data by referencing the input source list L2. When the input data is present, the process-thread control unit 16 proceeds to step S52. When the input data is not present, the determination operation in step S51 is repeated.

Step S52 The process-thread control unit 16 recognizes the number of pieces of the input data. When the number of pieces of the input data is two or less, processing proceeds to step S58. When the number of pieces of the input data is three or more, processing proceeds to step S53.

Step S53 The process-thread control unit 16 determines whether there exists data that has not yet arrived. When there exists data that has not arrived, processing proceeds to step S54. When all the data has arrived, processing proceeds to step S58.

Step S54 The process-thread control unit 16 edits the conversion list L1. For example, the process-thread control unit 16 segments item entries of the conversion type (link) of the conversion list L1 by the number of rounds of the data link process which is set in response to the number of pieces of the input data.

Step S55 The process-thread control unit 16 performs a conversion order optimization process (as described below with reference to FIG. 25).

Step S56 The process-thread control unit 16 edits the input source list. For example, the process-thread control unit 16 adds information related to the virtual data to the input source list.

Step S57 The process-thread control unit 16 starts up process-thread control that waits for the arrival of remaining data.

Step S58 The process-thread control unit 16 calls the data link processing unit 12a and the data processing unit 12b.

Step S59 The process-thread control unit 16 determines whether all the data has been processed. When all the data has been processed, processing proceeds to step S60. When not all the data is processed, the determination operation in step S59 is repeated.

Step S60 The process-thread control unit 16 calls the data delivery processor 13.

Figure 25:
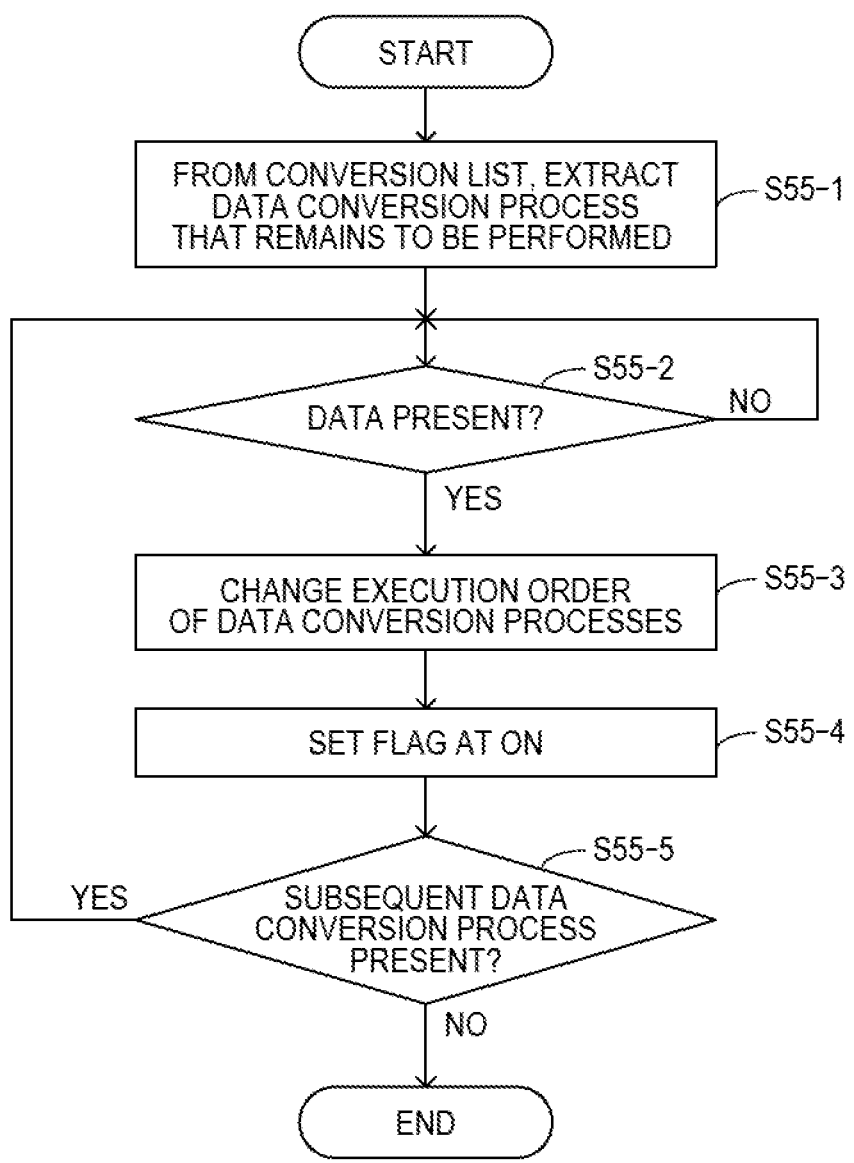
FIG. 25 is a diagram illustrating an example of an operational flowchart for a conversion order optimization process, according to an embodiment.

FIG. 25 is an operational flowchart illustrating the conversion order optimization process.

Step S55-1 The process-thread control unit 16 extracts from the conversion list L1 a data conversion process that has not been performed.

Step S55-2 The process-thread control unit 16 determines whether data that is used to perform the data conversion process that has not been performed is present (ready). When the data is present, processing proceeds to step S55-3. When the data is not present, the determination operation in step S55-2 is repeated.

Step S55-3 The process-thread control unit 16 changes the execution order of the data conversion processes.

Step S55-4 The process-thread control unit 16 sets the flag at on.

Step S55-5 The process-thread control unit 16 determines whether a subsequent data conversion process is present. When the subsequent data conversion process is present, processing returns to step S55-2. When the subsequent data conversion process is not present, processing ends.

The embodiments have been described. Each element in each of the embodiments may be replaced with an element having a similar function. Any optional element or any optional process step may be added to the embodiments. Two or more elements (features) of the embodiments may be combined in use.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a procedure comprising:

collecting record data for a collection target from a plurality of information sources, the record data including a first record data, a second record data, and a third record data the collection target including the first record data, the second record data, and the third record data;

when a process to be performed on the collected record data is determined, with reference to definition information on the process, to be able to generate result data from the first record data without the second record data and the third record data, starting the process on the first record data without waiting for an arrival of the second record data and the third record data from the plurality of information sources;

when first pieces of the record data are required to be referenced in order for the process to generate the result data and the first pieces of the record data includes an uncollected piece of the record data, starting the process in response to completion of collecting all the record data from the plurality of information sources;

segmenting a conversion process included in the process into a plurality of individual processes;

when performing the conversion process including a plurality of link processes and a processing process, determining in accordance with the definition information whether there exists the processing process to be performed on the collected record data;

when there exists the processing process to be performed on the collected record data, determining whether the processing process is executable in course of performing the plurality of link processes;

when the processing process is determined to be unexecutable in course of performing the plurality of link processes, executing the processing process subsequent to completion of performing all the plurality of link processes; and when the processing process is determined to be executable in course of performing the plurality of link processes, executing the processing process by inserting the processing process between the plurality of link processes.

2. The non-transitory, computer-readable recording medium of claim 1, the procedure further comprising:

when the first pieces of the record data have been collected, starting the process without waiting for an arrival of all the record data from the plurality of information sources.

3. The non-transitory, computer-readable recording medium of claim 1, the procedure further comprising:

when second pieces of the record data that allow a portion of the plurality of individual processes to be executed have been collected, performing the conversion process by executing the portion of the plurality of individual processes in advance without waiting for collecting all the record data.

4. The non-transitory, computer-readable recording medium of claim 3, the procedure further comprising:

determining in accordance with the definition information whether a predetermined item entry is present in the collected record data, and performing the conversion process by changing an order of execution of the plurality of individual processes such that an individual process on the record data including the predetermined item entry is executed in advance.

5. The non-transitory, computer-readable recording medium of claim 3, the procedure further comprising performing a link process on the record data, the link process including:

generating virtual record data by performing a first link process in advance on first record data in the record data that have arrived already, and performing a second link process on the virtual record data and second record data in the record data that arrive subsequently.

6. The non-transitory, computer-readable recording medium of claim 5, the procedure further comprising when the first record data include third pieces of the record data and fourth pieces of the record data, the third pieces of the record data are in course of collecting, and the fourth pieces of the record data have been collected, generating the virtual record data by reading the third pieces of the record data through a pipeline process and by performing the link process that successively links portions of the third pieces of the record data being read through the pipeline process, in an order of reading, to the fourth pieces of the record data, and outputting the generated virtual record data.

7. The non-transitory, computer-readable recording medium of claim 6, the procedure further comprising in response to an output status of the virtual record data and a collection status of fifth pieces of the record data that are to be linked to the virtual record data, performing the link process that links the virtual record data and the fifth pieces of the record data, by changing target record data to be read through the pipeline process.

8. The non-transitory, computer-readable recording medium of claim 7, the procedure further comprising when outputting of the virtual record data has completed, and the fifth pieces of the record data are in course of collecting, performing the link process on the virtual record data and the fifth pieces of the record data by reading the fifth pieces of the record data through the pipeline process; and when the virtual record data is in course of outputting, and the fifth pieces of the record data have been collected, performing the link process on the virtual record data and the fifth pieces of the record data by reading the third pieces of the record data through the pipeline process.

9. An apparatus comprising:

a processor configured to:

collect record data for a collection target from a plurality of information sources, the record data including a first record data, a second record data, and a third record data, the collection target including the first record data, the second record data, and the third record data, when a process to be performed on the collected record data is determined, with reference to definition information on the process, to be able to generate result data from the first record data, start the process on the first record data without waiting for an arrival of the second record data and the third record data from the plurality of information sources, and when pieces of the record data are required to be referenced in order for the process to generate the result data and the pieces of the record data includes an uncollected piece of the record data, start the process in response to completion of collecting all the record data from the plurality of information sources, segment a conversion process included in the process into a plurality of individual processes;

when performing the conversion process including a plurality of link processes and a processing process, determine in accordance with the definition information whether there exists the processing process to be performed on the collected record data, when there exists the processing process to be performed on the collected record data, determine whether the processing process is executable in course of performing the plurality of link processes, when the processing process is determined to be unexecutable in course of performing the plurality of link processes, execute the processing process subsequent to completion of performing all the plurality of link processes, and when the processing process is determined to be executable in course of performing the plurality of link processes, execute the processing process by inserting the processing process between the plurality of link processes.

10. A method performed by an information processing apparatus including a processor, the method comprising:

collecting record data for a collection target from a plurality of information sources, the record data including a first record data, a second record data, and a third record data, the collection target including the first record data, the second record data, and the third record data;

with reference to definition information on a process to be performed on the collected record data, when the process is determined to be able to generate result data from the first record data, starting the process on the first record data without waiting for an arrival of the second record data and the third record data from the plurality of information sources;

when first pieces of the record data are required to be referenced in order for the process to generate the result data and the first pieces of the record data includes an uncollected piece of the record data, starting the process in response to completion of collecting all the record data from the plurality of information sources;

segmenting a conversion process included in the process into a plurality of individual processes;

when performing the conversion process including a plurality of link processes and a processing process, determining in accordance with the definition information whether there exists the processing process to be performed on the collected record data;

when there exists the processing process to be performed on the collected record data, determining whether the processing process is executable in course of performing the plurality of link processes;

when the processing process is determined to be unexecutable in course of performing the plurality of link processes, executing the processing process subsequent to completion of performing all the plurality of link processes; and when the processing process is determined to be executable in course of performing the plurality of link processes, executing the processing process by inserting the processing process between the plurality of link processes.

* * * * *